US009037448B2

(12) United States Patent
Ito et al.

(10) Patent No.: US 9,037,448 B2
(45) Date of Patent: May 19, 2015

(54) COMPUTER SYSTEM, PROGRAM, AND METHOD FOR ASSIGNING COMPUTATIONAL RESOURCE TO BE USED IN SIMULATION

(75) Inventors: Yasuhiro Ito, Kodaira (JP); Yasuo Sugure, Kodaira (JP); Shigeru Oho, Tokyo (JP); Hideaki Kurata, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 498 days.

(21) Appl. No.: 13/387,243

(22) PCT Filed: Jul. 16, 2010

(86) PCT No.: PCT/JP2010/062081
§ 371 (c)(1),
(2), (4) Date: Jan. 26, 2012

(87) PCT Pub. No.: WO2011/016327
PCT Pub. Date: Feb. 10, 2011

(65) Prior Publication Data
US 2012/0123764 A1     May 17, 2012

(30) Foreign Application Priority Data
Aug. 7, 2009   (JP) ................................ 2009-184616

(51) Int. Cl.
*G06F 9/44* (2006.01)
*G06F 11/36* (2006.01)
*G06F 9/50* (2006.01)

(52) U.S. Cl.
CPC .......... *G06F 11/3664* (2013.01); *G06F 9/5055* (2013.01)

(58) Field of Classification Search
USPC ......................................................... 703/21
See application file for complete search history.

(56) References Cited

U.S. PATENT DOCUMENTS 5,778,224 A * 7/1998 Tobe et al. .................... 718/100
6,321,181 B1 * 11/2001 Havens .......................... 703/13
(Continued)

FOREIGN PATENT DOCUMENTS

GB    2 274 345 A    7/1994
JP    6-214962 A     8/1994
(Continued)

OTHER PUBLICATIONS

English Translation of Yutaka et al. (Japanese Pub. No. : JP 2008-84121, Apr. 10, 2008).*
(Continued)

*Primary Examiner* — Omar Fernandez Rivas
*Assistant Examiner* — Iftekhar Khan
(74) *Attorney, Agent, or Firm* — Crowell & Moring LLP

(57) ABSTRACT

The cost necessary for introducing and maintaining a development environment that includes multiple simulators is suppressed, and a sharing of designing information is promoted, to make parameter adjustment of simulators easy. Provided is a service that unifies development environment on a computer provided with: a working computer system that can guarantee that there is no leaking of designing files; a user behavior monitoring system that collects utilization history of simulators or software, for each of the users, and selects development process of each of the users from the collected information; and a dynamic computational-resource distribution system that can conduct an automatic optimization of a complex simulation configuration, from information collected by the aforementioned user behavior monitoring system.

13 Claims, 28 Drawing Sheets

(56) References Cited

U.S. PATENT DOCUMENTS

| | | | |
|---|---|---|---|
| 6,944,606 B2* | 9/2005 | Schmit et al. | 706/60 |
| 2002/0059427 A1 | 5/2002 | Tamaki et al. | |
| 2002/0152305 A1* | 10/2002 | Jackson et al. | 709/224 |
| 2003/0220939 A1 | 11/2003 | Nagao | |
| 2004/0144168 A1 | 7/2004 | Oku | |
| 2006/0101413 A1* | 5/2006 | Kinno et al. | 717/127 |
| 2006/0117274 A1* | 6/2006 | Tseng et al. | 716/1 |
| 2009/0234825 A1* | 9/2009 | Xia et al. | 707/4 |
| 2009/0249340 A1* | 10/2009 | Akiyama et al. | 718/100 |
| 2010/0262864 A1* | 10/2010 | Tsujido et al. | 714/32 |
| 2010/0274549 A1* | 10/2010 | Tal et al. | 703/17 |
| 2013/0151220 A1* | 6/2013 | Matsumura et al. | 703/7 |
| 2013/0204587 A1* | 8/2013 | Cheng et al. | 703/2 |

FOREIGN PATENT DOCUMENTS

| | | |
|---|---|---|
| JP | 8-50576 A | 2/1996 |
| JP | 2002-24192 A | 1/2002 |
| JP | 2003-263317 A | 9/2003 |
| JP | 2004-219173 A | 8/2004 |
| JP | 2008-84121 A | 4/2008 |
| JP | 2009-110521 A | 5/2009 |

OTHER PUBLICATIONS

Japanese-language Office Action dated Apr. 9, 2013 with English translation (Five (5) pages).

International Search Report with English translation dated Aug. 31, 2010 (five (5) pages).

\* cited by examiner

| USER | TOOL | START TIME | END TIME | NODE CLASS | AVERAGE/PEAK CPU USAGE | AVERAGE/PEAK RAM USAGE |
|---|---|---|---|---|---|---|
| H | X | YEAR/MONTH/DAY/HOUR /MINUTE/SECOND | YEAR/MONTH/DAY/HOUR /MINUTE/SECOND | X | 20% / 90% | 2GB / 5GB |
| M | X | YEAR/MONTH/DAY/HOUR /MINUTE/SECOND | YEAR/MONTH/DAY/HOUR /MINUTE/SECOND | G | 40% / 40% | 4GB / 6GB |
| T | Z | YEAR/MONTH/DAY/HOUR /MINUTE/SECOND | YEAR/MONTH/DAY/HOUR /MINUTE/SECOND | F | 95% / 100% | 7GB / 7GB |

1700

| USER | USED STORAGE CAPACITY | STORAGE CLASS |
|---|---|---|
| H | 40GB | S |
| T | 209GB | H |
| H | 39393GB | A |

1720

| USER | LOGIN TIME | LOGOUT TIME |
|---|---|---|
| H | YEAR/MONTH/DAY/HOUR /MINUTE/SECOND | YEAR/MONTH/DAY/HOUR /MINUTE/SECOND |
| M | YEAR/MONTH/DAY/HOUR /MINUTE/SECOND | YEAR/MONTH/DAY/HOUR /MINUTE/SECOND |
| M | YEAR/MONTH/DAY/HOUR /MINUTE/SECOND | YEAR/MONTH/DAY/HOUR /MINUTE/SECOND |

| USER | FILE PATH | OPERATION TYPE | TIME |
|---|---|---|---|
| H | /root/XXX | Read/Write/DEL/create | YEAR/MONTH/DAY/HOUR/MINUTE/SECOND |
| T | /root/XXX | Read/Write/DEL/create | YEAR/MONTH/DAY/HOUR/MINUTE/SECOND |

1820

| USER | TOOL | EVENT 0 | EVENT 1 | EVENT 2 | EVENT 3 | TIME |
|---|---|---|---|---|---|---|
| H | X | MOUSE_DOWN | WM0001 | | SCR00001 | YEAR/MONTH/DAY/HOUR/MINUTE/SECOND |
| T | X | TEXT_INPUT | WM0003_393 | TEST | | YEAR/MONTH/DAY/HOUR/MINUTE/SECOND |
| T | Y | BUTTON_PUSH | WM0001_2333 | | but002 | YEAR/MONTH/DAY/HOUR/MINUTE/SECOND |

1810

| USER | TOOL | NODE | EVENT CONTENT | TIME |
|---|---|---|---|---|
| H | X | 192.168.XXX.YYY | used XXX | YEAR/MONTH/DAY/HOUR/MINUTE/SECOND |
| T | X | 192.168.XXX.YYY | selected YYY mode | YEAR/MONTH/DAY/HOUR/MINUTE/SECOND |
| T | Y | 192.168.XXX.YZZ | kill ZZZ | YEAR/MONTH/DAY/HOUR/MINUTE/SECOND |

FIG. 19

| PART NAME | TOOL | VERSION | MODEL GRANULARITY | CONNECTION INFORMATION |
|---|---|---|---|---|
| ECU001 | XXXX | 1.000.1 | TLM | ANIN 3;ANOUT4; |
| ENGINE | YYYY | 202.201 | 0.001 | ANIN 3;ANOUT3; |

| NODE CLASS | CPU TYPE | MEMORY TYPE | UNIT PRICE |
|---|---|---|---|
| X | Xeon 3.0GHz | DDR3 8G | $3/1GRAM·h |
| G | Tesla 2.0GHz | GDDR3 16G | $6/h |
| F | V5 PACKAGE NAME | DDR2 2G | $12/h |

*1740*

*1730*

| STORAGE CLASS | TRANSFER RATE | UNIT PRICE |
|---|---|---|
| S | 20M/s | $20/ GB/MONTH |
| H | 10M/s | $5/ GB/MONTH |
| A | 5M/s | $2/ GB/MONTH |

*1750*

| TOOL | VENDOR | FUNCTION | UNIT PRICE PER USER/VENDOR |
|---|---|---|---|
| A | XX | X | $0.1/$0.09 |
| A | XX | Y | $0.3/0.289 |
| B | ZZ | Z | $0.4 / $0.4 |

FIG. 24

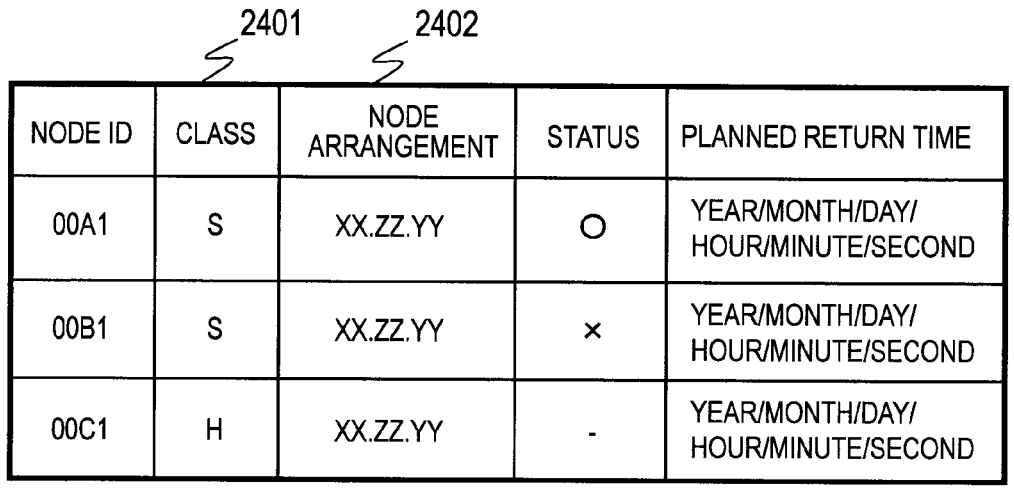

| NODE ID | CLASS | NODE ARRANGEMENT | STATUS | PLANNED RETURN TIME |
|---|---|---|---|---|
| 00A1 | S | XX.ZZ.YY | ○ | YEAR/MONTH/DAY/HOUR/MINUTE/SECOND |
| 00B1 | S | XX.ZZ.YY | × | YEAR/MONTH/DAY/HOUR/MINUTE/SECOND |
| 00C1 | H | XX.ZZ.YY | - | YEAR/MONTH/DAY/HOUR/MINUTE/SECOND |

FIG. 25

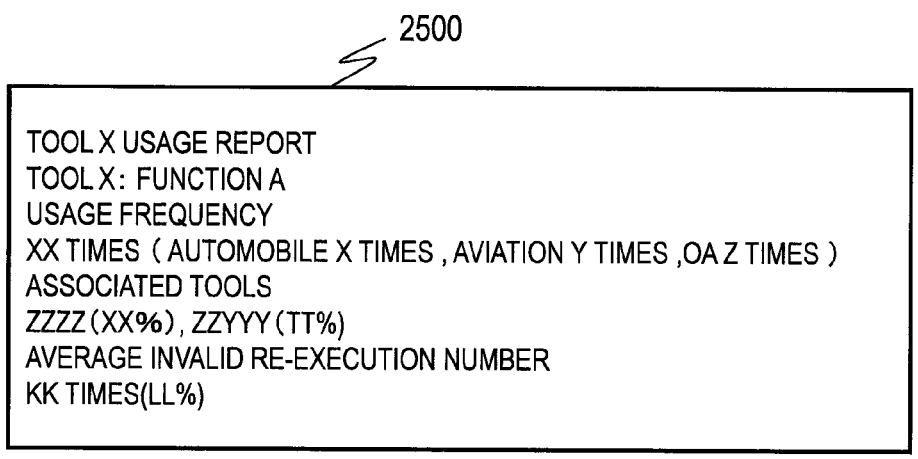

TOOL X USAGE REPORT
TOOL X: FUNCTION A
USAGE FREQUENCY
XX TIMES (AUTOMOBILE X TIMES, AVIATION Y TIMES, OA Z TIMES)
ASSOCIATED TOOLS
ZZZZ(XX%), ZZYYY(TT%)
AVERAGE INVALID RE-EXECUTION NUMBER
KK TIMES(LL%)

FIG. 26A

| SIMULATION ID | USER | PRIORITY OPTION | START TIME | TARGET END TIME | ACTUAL END TIME | SIMULATION CONFIGURATION FILE PATH | SIMULATION EFFECTIVENESS |
|---|---|---|---|---|---|---|---|
| 0 | H | R | YEAR/MONTH/DAY/ HOUR/MINUTE/ SECOND | YEAR/MONTH/DAY/ HOUR/MINUTE/ SECOND | YEAR/MONTH/DAY/ HOUR/MINUTE/ SECOND | aaaaaaaaaaaaaaaaa | 1 |
| 1 | T | H | YEAR/MONTH/DAY/ HOUR/MINUTE/ SECOND | YEAR/MONTH/DAY/ HOUR/MINUTE/ SECOND | YEAR/MONTH/DAY/ HOUR/MINUTE/ SECOND | bbbbbbbbbbbbbb | 2 |
| 2 | T | S | YEAR/MONTH/DAY/ HOUR/MINUTE/ SECOND | YEAR/MONTH/DAY/ HOUR/MINUTE/ SECOND | YEAR/MONTH/DAY/ HOUR/MINUTE/ SECOND | cccccccccccccc | 3 |
| 3 | M | A | YEAR/MONTH/DAY/ HOUR/MINUTE/ SECOND | YEAR/MONTH/DAY/ HOUR/MINUTE/ SECOND | YEAR/MONTH/DAY/ HOUR/MINUTE/ SECOND | dddddddddddddd | 4 |

| CONFIGURATION ID | SIMULATION ID | SIMULATOR TYPE | SIMULATION MODEL FILE PATH | NEIGHBORING CONFIGURATION ID |
|---|---|---|---|---|
| 0 | 4 | XXXX | YYYYY | 1,2,3,4 |

GROUP XXXX

USAGE FEE TOTAL $1,500

SOFTWARE CREATION MODE BREAKDOWN

| USER | USED NODE | USED NODE UNIT PRICE | USAGE TIME |
|---|---|---|---|
| A | S | $0.1 | 4000s |
| B | D | $0.02 | 3000s |

STORAGE USAGE BREAKDOWN

| USER | USED AREA | UNIT PRICE |
|---|---|---|
| A | 300GB | $5 |
| B | 200GB | $1 |

SIMULATION MODE BREAKDOWN

| USER | SOFTWARE | SOFTWARE UNIT PRICE | USED NODE | USED NODE UNIT PRICE | USAGE TIME | AVERAGE LOAD | USAGE OPTION |
|---|---|---|---|---|---|---|---|
| A | X | $1.0 | ZZZZZ | $0.2 | 4000s | 90% | - |
| A | Y | $0.8 | ZZZZZ | $0.2 | 2000s | 20% | - |
| A | Z | $0.2 | XXXXX | $0.8 | 1000s | 100% | RAPID |
| B | Y | $0.3 | ZZZZZ | $0.2 | 3000s | 40% | - |

SOFTWARE PROVIDER   XXXX

LICENSE FEE TOTAL   $12,566

| FUNCTION/SOFTWARE | TOTAL USAGE FREQUENCY | TOTAL USAGE TIME | UNIT PRICE |
|---|---|---|---|
| XXXXX/ZZZZ | 495 | 4040s | $1.3 |
| XXAAA/ZZZZ | 21 | 500s | $1.3 |
| YYYYY/ZZZZ | 329 | 4300s | $0.8 |
| YYBBB/ZZZZ | 944 | 4030s | $0.8 |

COMPUTER SYSTEM, PROGRAM, AND METHOD FOR ASSIGNING COMPUTATIONAL RESOURCE TO BE USED IN SIMULATION

BACKGROUND OF THE INVENTION

The present invention relates to a technology used in a development environment, in which a plurality of simulators execute a coordinated complicated simulation in the development of an embedded system.

An embedded system is a system composed of a mechanism constituting a control object, hardware for performing a control operation based on a physical quantity received from the mechanism and outputting a control value to the mechanism, and software which operates on the hardware. For example, an embedded system of an automotive vehicle is composed of an engine as a control object, an electronic device such as a microcomputer for controlling the engine, and software which operates on the microcomputer. Since the behavior of the software included in the embedded system strongly depends on the mechanism of the control object and the configuration of the hardware, it is necessary to analyze combined behavior of the mechanism, the hardware and the software.

In recent years, embedded systems have become more complicated to make automotive vehicles, electrical apparatuses and the like more reliable and more functional. Accordingly, to shorten a working period, parts of hardware and software are fragmented and specialized and development is simultaneously carried out at a plurality of sites. As fragmentation progresses, deficiency in performance and defect in specification which are ascertained when the parts are assembled are on the increase in addition to checking of the operation of each part. Thus, a delay in development period caused by a rework at a final stage before product shipment frequently occurs, thereby causing a problem of deteriorating development efficiency.

To solve this problem, it has been started to use a performance evaluation and verification technique by a simulation in which the mechanism, the hardware and the software are collaborated at the time of designing. In a mechanism/hardware/software collaborated simulation, a collaborative simulation at the overall product level is executed by mutually connecting different types of simulators since usable simulators differ depending on the configurations of the mechanism and the hardware to be simulated and simulation models created for specific simulators are already accumulated.

Conventionally, to execute a collaborative simulation in which a plurality of simulators are mutually connected, it is necessary to build an execution environment on a computer of each individual. For this, the following five problems exist. The first problem is that it is difficult to share design files and manage progresses due to the simultaneous development at a plurality of sites. The second problem is that cost for manually adjusting the simulators and connection parameters among the simulators increase since different simulators need to be connected.

The third problem is that cost for introduction and maintenance is high since a plurality of simulators are used. The fourth problem is that computational capability becomes insufficient since a plurality of simulators are operated. The fifth problem is a high risk of information leakage since design files are stored in each individual PC.

As one way of coping with the above problems, it is thought to unify development environments. As a known technology on unification of development environments, a computational environment providing service is disclosed in patent literature 1. In this service, a server on a network is rent to a user and the user obtains a computational environment by remotely controlling the server.

CITATION LIST

Patent literature 1: JP2002-24192A

SUMMARY OF THE INVENTION

The technology of the above patent literature 1 can solve the fourth and fifth ones of the above problems, but cannot solve the other problems and service users need to individually deal with them. Problems the present invention seeks to solve are the first to third ones of the problems descried in the above background art.

As described above, the first problem is that it is difficult to share design files and manage progresses due to the simultaneous development at a plurality of sites. Further, the second problem is that cost for manually adjusting the individual simulators and connection parameters among the simulators increases since different simulators need to be connected. Furthermore, the third problem is that cost for introduction and maintenance of the hardware and the software is high and it is difficult to easily execute a simulation since a plurality of simulators and computational resources are necessary.

The present invention has been developed in view of the above problems and an object is to suppress cost required for introduction and maintenance of a development environment including a plurality of simulators, share design information and facilitate adjustment of parameters of the simulators.

An aspect of the present invention solves the first problem by including a mechanism for selecting and recording a simulator or software usage history of each user with high accuracy in embedded system development and another mechanism for selecting a development process of the user from information collected by the former mechanism and recording it.

Further, the second problem is solved by including a mechanism for automatically optimizing a simulation configuration from the information collected by the former mechanism.

Furthermore, the third problem is solved by enabling a reduction in initial investment for environment and facilities by a service which realizes unification of development environments on a computer including the above mechanisms.

Accordingly, since an aspect of the present invention allows simulators or software to be all managed on a server system, embedded system developers need not purchase them in advance and maintain them. Further, since developed software and simulation results using the software are managed on the server system, it becomes easier to share design files and a risk of leaking information to outsiders can be suppressed to a minimum level.

Further, since the developers can easily execute quick and accurate simulations without requiring detailed know-how due to the cooperation of a plurality of simulators and automated adjustment of simulator parameters, development efficiency of the embedded system is improved.

BRIEF DESCRIPTION OF THE DRAWINGS

FIG. 17 is a diagram showing the first embodiment of the present invention and a table configuration example of a resource usage management database and a resource price database, FIG. 18 is a diagram showing the first embodiment of the present invention and a table configuration example of an operation history database, FIG. 19 is a diagram showing the first embodiment of the present invention and a table configuration example of a tool/model database, FIG. 20 is a diagram showing the first embodiment of the present invention and a table configuration example of the resource price database, FIG. 24 is a diagram showing the first embodiment of the present invention and an example of a database for managing a state of the simulation computational resources, FIG. 25 is a diagram showing the first embodiment of the present invention and an example of a tool usage status report, FIG. 26A is a diagram showing the first embodiment of the present invention and an example of a simulation configuration table of a simulation configuration history database, FIG. 26B is a diagram showing the first embodiment of the present invention and an example of a simulation configuration table of the simulation configuration history database, FIG. 27 is a diagram showing the first embodiment of the present invention and an example of a system usage fee report for a user, FIG. 28 is a diagram showing the first embodiment of the present invention and an example of a license fee report for a software provider.

DETAILED DESCRIPTION OF THE EMBODIMENTS

First Embodiment

Figure 1:
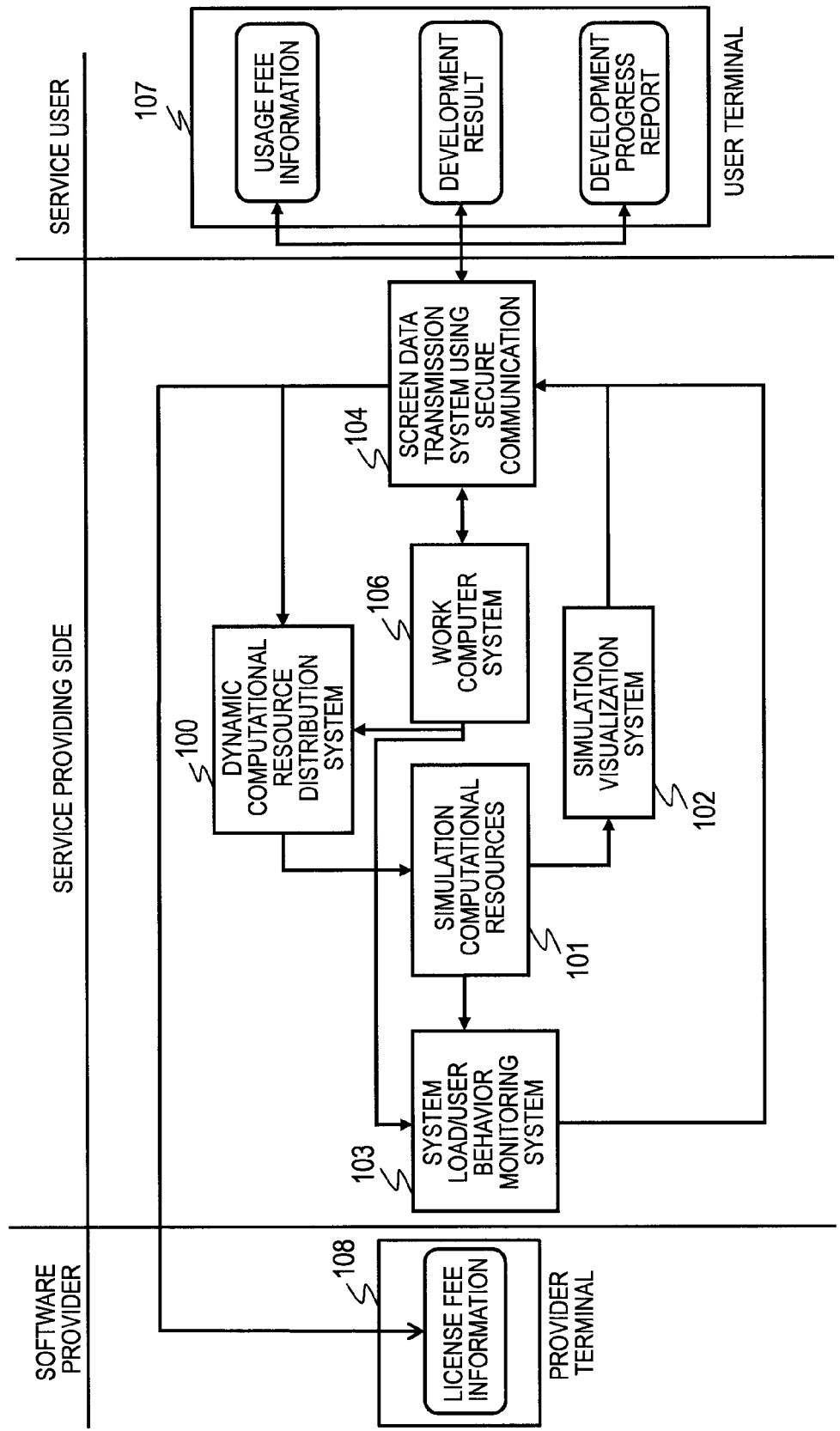
FIG. 1 is a block diagram showing a first embodiment of the present invention and functional elements of a computer system.

Hereinafter, one embodiment of the present invention is described based on the accompanying drawings. FIG. 1 is a functional block diagram schematically showing one example of the embodiment of the present invention and a computer system (development assisting system for embedded devices) for assisting the development of an embedded system.

In a computer system used to develop an embedded system, a dynamic computational resource distribution system 100, simulation computational resources 101, a simulation result visualization system 102, a system load/user behavior monitoring system 103, a work computer system 106, a screen data transmission system 104 using secure communication, a user terminal 107 and a software provider terminal 108 are connected via an internal network.

The above configuration is called the present system below. The user terminal 107 and the software provider terminal 108 can access the present system only via the screen data transmission system 104 using secure communication. Note that each of the systems, computational resources and terminals are constructed by a computer including a processor, a memory and an interface.

Further, the embedded system is a combination of a mechanism as a control object, hardware for driving the mechanism and software for controlling the hardware.

A summary of the present system is that embedded software is created in the work computer system 106 in accordance with an input or command from the user terminal 107 and a simulation of the created embedded software is optimized in the dynamic computational resource distribution system 100.

The dynamic computational resource distribution system 100 executes an optimized simulation task in the simulation computational resources 101 including a plurality of computers. The simulation computational resources 101 includes simulation software (simulators) for executing a simulation, a computer (cluster node 1400 in FIG. 14) for executing a simulation, a plurality of applications for executing a plurality of types of simulations, and a plurality of computers for executing the applications.

When a simulation of the embedded software is executed, the user terminal 107 instructs the dynamic computational resource distribution system 100 to execute the simulation. The dynamic computational resource distribution system 100 secures software resources and hardware resources of the simulation computational resources 101 and executes the simulation based on a request from the user terminal 107.

The screen data transmission system 104 functions as a gateway for transmitting and receiving data to and from the user terminal 107 or the software provider terminal 108, authenticates the user terminal 107 (or the software provider terminal 108), and transmits and receives data to and from the user terminal 107 (or the software provider terminal 108) by highly confidential communication (hereinafter, secure communication) such as encrypted communication.

The present system also includes the simulation result visualization system 102. The simulation result visualization system 102 includes a computer for providing a simulation result calculated by the simulation computational resources 101 such as in the form of a graph to the user terminal 107.

The present system also includes the system load/user behavior monitoring system 103. The system load/user behavior monitoring system 103 includes a computer for collecting hardware and software operational statuses of the simulation computational resources 101, a computer for collecting a progress status of the embedded system developed in response to an input or a command from the user terminal 107 or the like and generates billing information and statistical information for each user terminal 107. Note that each of the computer systems is described in detail later.

Figure 2:
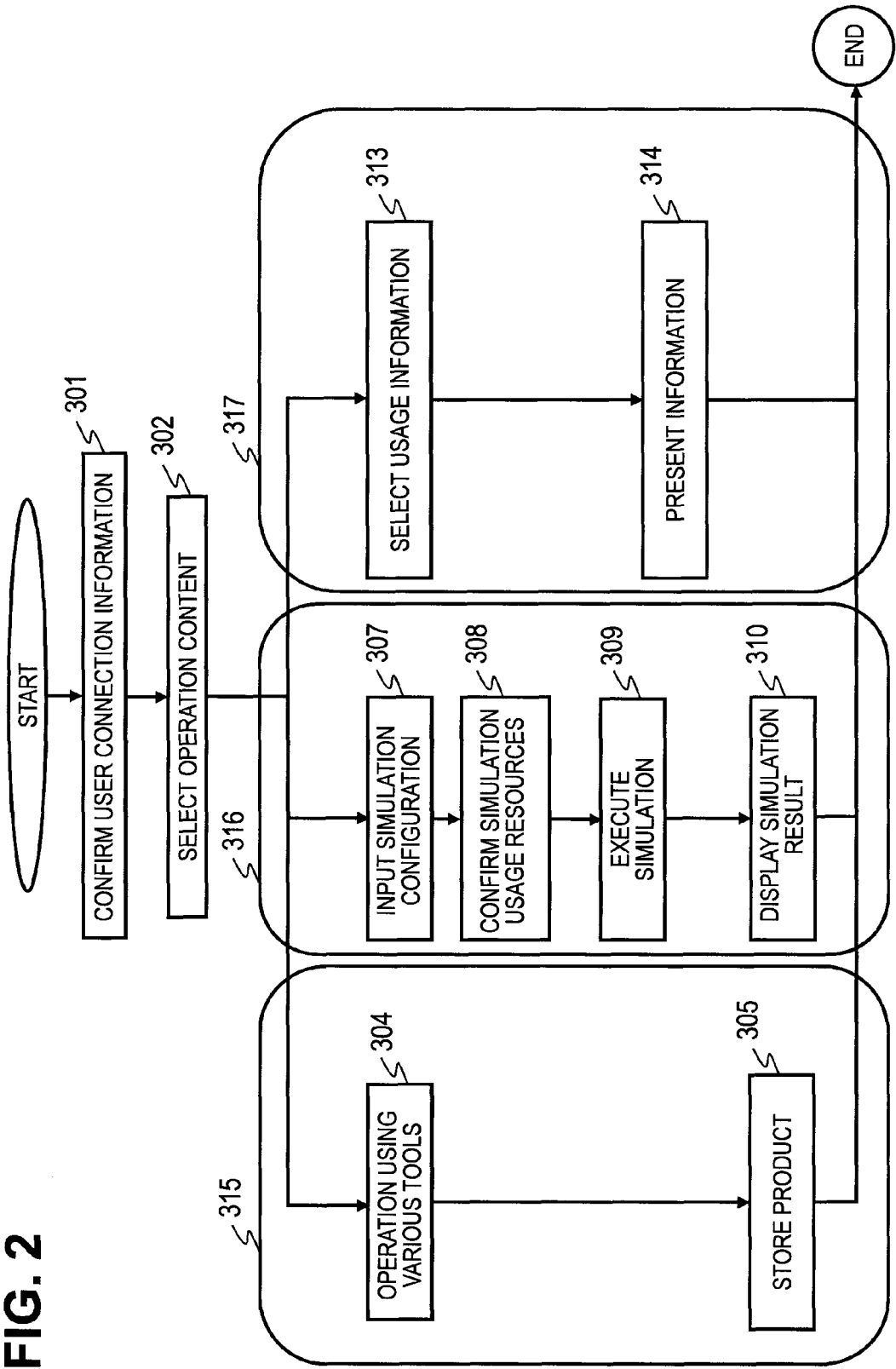
FIG. 2 is a flow chart showing the first embodiment of the present invention and an example of a process performed in a user terminal.

FIG. 2 is a flow chart of a development work of the embedded system performed in the user terminal 107 in the present system. An operation when a user utilizes the present system according to this embodiment using the user terminal 107 is described with reference to FIGS. 1 and 2.

First in Step 301, the user connects the user terminal 107 with the screen data transmission system 104. The screen data transmission system 104 authenticates whether or not the user terminal 107 possesses access authority to the present system. The software provider terminal 108 is similarly connected to the screen data transmission system 104, and the screen data transmission system 104 authenticates whether or not the software provider terminal 108 possesses access authority to the present system.

Since the user or the software provider certainly accesses via the screen data transmission system 104 after authentication, the description on the access via the screen data transmission system 104 is omitted below.

Subsequently, in Step 302, the user selects an operation content using the user terminal 107. The present system includes three operation content modes, which are a software creation mode 315 for creating the embedded software, a simulation mode 316 for executing a simulation to control the mechanism as the control object by the created embedded software and a development progress/tool usage status/system usage fee confirmation mode 317 for obtaining a usage status of the computational resources of the present system. In the above three modes, contents of services to be provided differ and, in addition, methods for calculating a system usage fee differ.

Further, the screen data transmission system 104 requests selection of any one of the above three modes to the user terminal 107 after authentication of the user terminal 107 is completed. When the user terminal 107 notifies a selection result to the screen data transmission system 104, the screen data transmission system 104 notifies the start of usage from the user terminal 107 to the computer system corresponding to the selected mode. The computer system (dynamic computational resource distribution system 100, the work computer system 106 or the system load/user behavior monitoring system 103) notified of the start of usage from the screen data transmission system 104 starts providing a service to the user terminal 107.

First, a work flow when the user selects the software creation mode 315 from the user terminal 107 is described. The user terminal 107 develops software for the embedded system by remotely operating the work computer system 106 in Step 304 and stores a created design file in Step 305. The user terminal 107 stores the design file in a storage device in the work computer system 106 or the present system.

Next, a work flow when the user selects the simulation mode 316 from the user terminal 107 is described. In the case of selecting the simulation mode, the dynamic computational resource distribution system 100, the simulation computational resources 101 and the simulation result visualization system 102 executes a simulation instructed by the user terminal 107 in response to a command from the user terminal 107.

First, in Step 307, the user inputs a simulation configuration (dependency relationship of a plurality of simulation tasks) using a plurality of commercial simulation software (or simulators) to the dynamic computational resource distribution system 100 from the user terminal 107.

In next Step 308, the dynamic computational resource distribution system 100 secures the simulators, the simulation result visualization system 102, and CPUs, a memory capacity, special computing units (accelerators) and a storage area in the simulation computational resources 101 sufficient to perform a simulation task received from the user terminal 107. The dynamic computational resource distribution system 100 calculates an arrangement relationship of the simulators on the simulation computational resources 101 and constructs an actual simulation task so that the simulation task configuration is optimally executed based on a coupling relationship of the parts (mechanism to be developed, hardware, software) in the simulation task input from the user terminal 107.

Note that the simulation task, the simulation configuration and the simulation task configuration are defined as below in the following description.

The simulation task indicates a simulation object in which the elements of the mechanism, the hardware and the software in the embedded system are coupled. A plurality of simulations can be included in a simulation task.

The simulation configuration defines a dependency relationship among the simulations when simulations are included in a simulation task.

Figure 23:
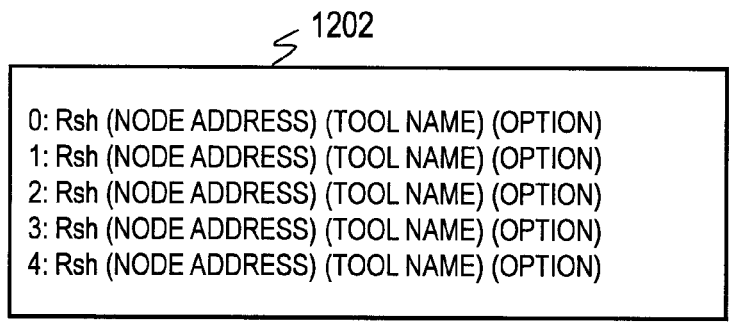
FIG. 23 is a diagram showing the first embodiment of the present invention and an example of a command list.

The simulation task configuration defines a relationship between the cluster nodes 1400 of the simulation computational resources 101 and simulations to be allocated to the cluster nodes 1400. The simulation task configuration is, for example, expressed by a command list as shown in FIG. 23.

Figure 11:
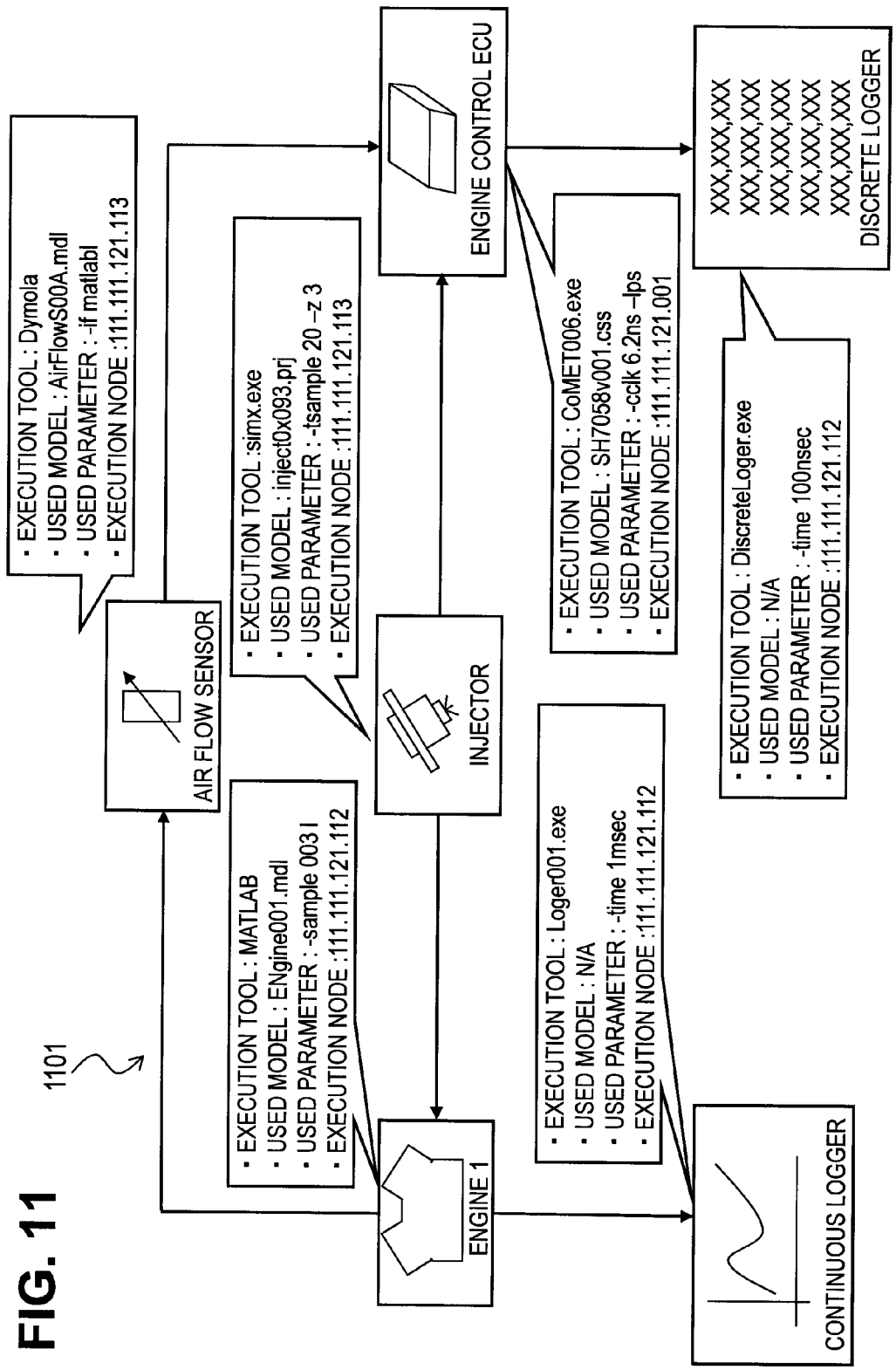
FIG. 11 is a diagram showing the first embodiment of the present invention and a task configuration result.

A task creation result, for example, in the case of developing a control system for an internal combustion engine as an embedded system is shown in FIG. 11. If a simulation of an engine control ECU (Electronic Control Unit) is a simulation task, simulation elements (parts) are the engine control ECU, an air flow meter, an injector and an engine. Then, a plurality of simulation software programs (simulators) respectively corresponding to the engine control ECU, the air flow meter, the injector and the engine are executed. The cluster nodes 1400 that execute the respective simulators are allocated by the simulation task configuration.

The dependency relationship (simulation configuration) of the simulators is as described below in the example of FIG. 11. Data such as an intake air amount of the air flow meter are input to the simulator of the engine control ECU. A fuel injection amount and the like from the engine control ECU are input to the simulator of the injector. A fuel injection period and a fuel injection amount from the injector are input to the simulator of the engine. The rotational speed and the like of the engine are input to the simulator of the air flow meter. Further, an engine output is input to a simulator (Loger001.exe of FIG. 11) of the entire system. That is, an input/output relationship of data among simulation software programs is the simulation configuration.

Thereafter, the simulation is executed in Step 309. Specifically, if the user instructs to execute the simulation task configuration constructed in the dynamic computational resource distribution system 100 from the user terminal 107, the dynamic computational resource distribution system 100 inputs the simulation task to the simulation computational resources 101. The cluster node 1400 having the simulation task allocated thereto executes the simulation in the simulation computational resources 101.

Subsequently, a simulation result is displayed in Step 310. Specifically, the simulation result visualization system 102 analyzes the simulation task configuration input from the user terminal 107 and estimates a simulation result required by the user. The simulation result visualization system 102 further allocates the simulation result meeting the user's request to a simulation result visualization unit 715 in inside. The simulation result visualization unit 715 is an independent program included in the simulation result visualization system 102 and graphs one or more specific types of data by a specific method. There are a multitude of mounting forms depending on a graphing method and the type of data to be received.

The result of the simulation executed in the simulation computational resources 101 is transmitted to the simulation result visualization system 102. As described above, the simulation result is processed into a form desired by the user and presented to the user terminal 107 via the screen data transmission system 104 using the secure communication.

Next, an operation of collecting and recording information performed in the background of the present system during the execution of the above software creation mode 315 and simulation mode 316 is described.

Information is collected, recorded and its statistics is taken by the system load/user behavior monitoring system 103. This enables data collected in the development progress/tool usage status/system usage fee confirmation mode 317 described below to be provided to the user.

The system load/user behavior monitoring system 103 monitors and records a GUI operation and a file operation of the user terminal 107 in the work computer system 106 using the secure communication, the input of a simulation from the user terminal 107 in the dynamic computational resource distribution system 100 and system loads on CPUs, memories, network and storages in the simulation computational resources 101.

The system load/user behavior monitoring system 103 performs several processes using the obtained recorded GUI operation and file operation of the user terminal 107, a simulation instructed from the user terminal 107 and a system history data. These processes include calculation of a usage fee for the user terminal 107, creation of a development progress report of the user terminal 107 or a group to which the user belongs, calculation of a license fee payment amount for the software provider providing the simulators introduced into the simulation computational resources 101, and creation of a usage status report of the simulators introduced into the simulation computational resources 101.

A work flow when the above development progress/tool usage status/system usage fee confirmation mode 317 is selected is described with reference to FIG. 2. The present system performs this work using the system load/user behavior monitoring system 103.

In Step 313, the user terminal 107 selects the type of information desired to be browsed out of the development progress report, the software usage status report and the system usage fee report. In Step 314, the user terminal 107 browses the selected information via the screen data transmission system 104.

If the user is developing the embedded system or the like on the present system by operating the user terminal 107, the user receives the usage fee information and the development progress report of the present system calculated by the system load/user behavior monitoring system 103.

If the user is a software provider and provides software to the present system, the user can receive the software usage status and a report on license revenue from the usage of the software which are calculated by the system load/user behavior monitoring system 103.

Figure 3:
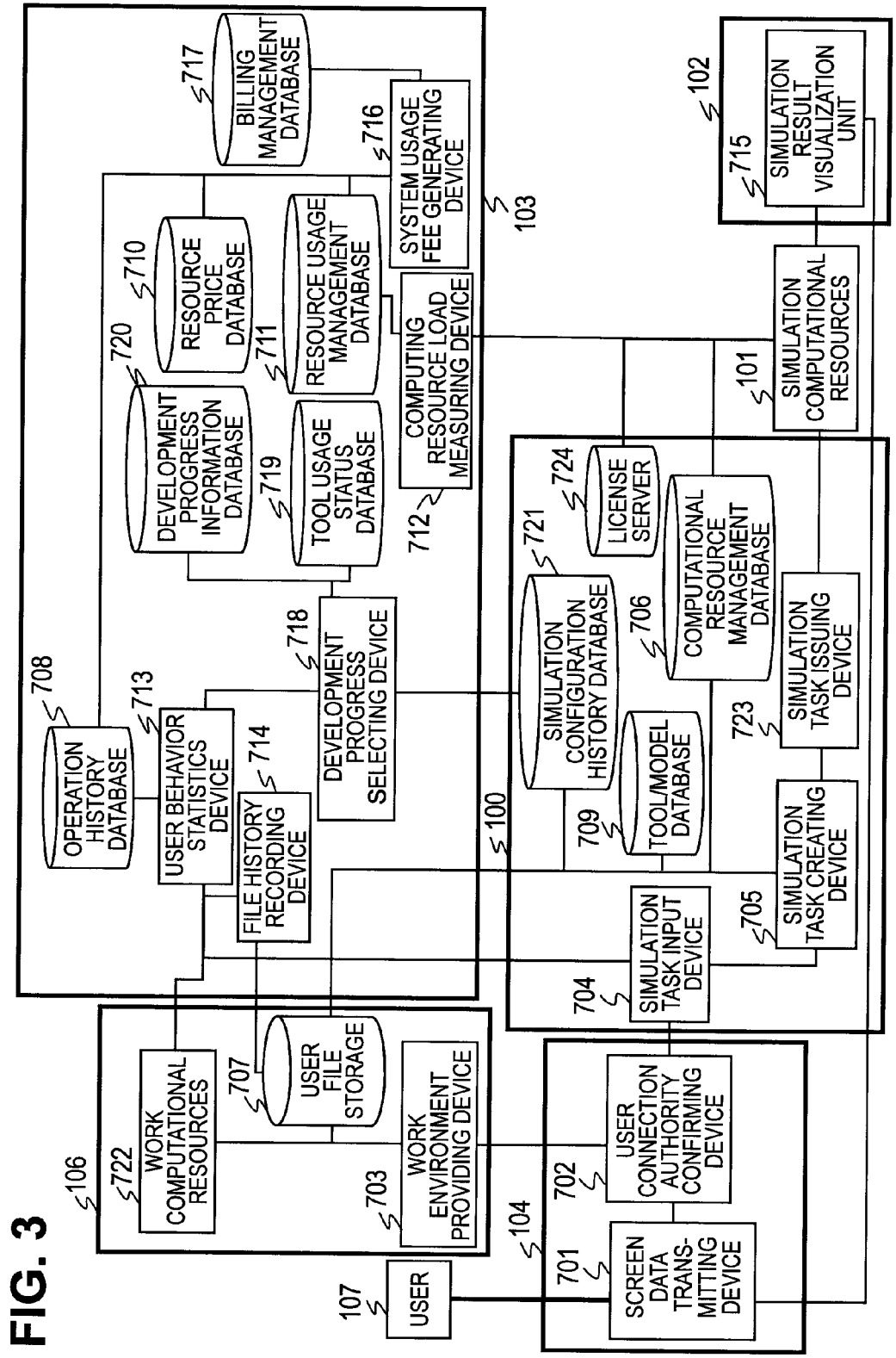
FIG. 3 is a block diagram showing the first embodiment of the present invention and the detailed configuration of the entire system.

Next, the present system is described in detail. FIG. 3 is a block diagram showing a detailed construction of devices necessary to execute the present system. A connection relationship of the devices in FIG. 3 merely shows an example of an embodiment and a widely or publicly known technology may be used if the functions described above can be obtained.

Confirmation of information for user connection (authentication) described in Step 301 of FIG. 2 is executed by a user connection authority confirming device 702 in the screen data transmission system 104 shown in FIG. 3. An authentication method using the exchange of files including encrypted individual identification information, an authentication method using a device including individual identification information encrypted at a user side and the like as well as a method using an ID number and a password for identifying a user (user terminal 107) can be used as an authentication method provided in the user connection authority confirming device 702.

Further, a method for providing a login program as an application on a web browser, a method for providing a login program as an independent application which operates on a user's personal computer (user terminal 107) and a method for introducing and providing an OS (Operating System), which is configured such that only a login program to the present system operates, to the above device including the individual identification information are thought as a method for providing a login program to the present system. However, in the present invention, a widely or publicly known technology may be used if it meets a requirement that communication confidentiality between the user and the present system is ensured and it is impossible for a person who is not authorized to use the present system to log into the present system.

Figure 4:
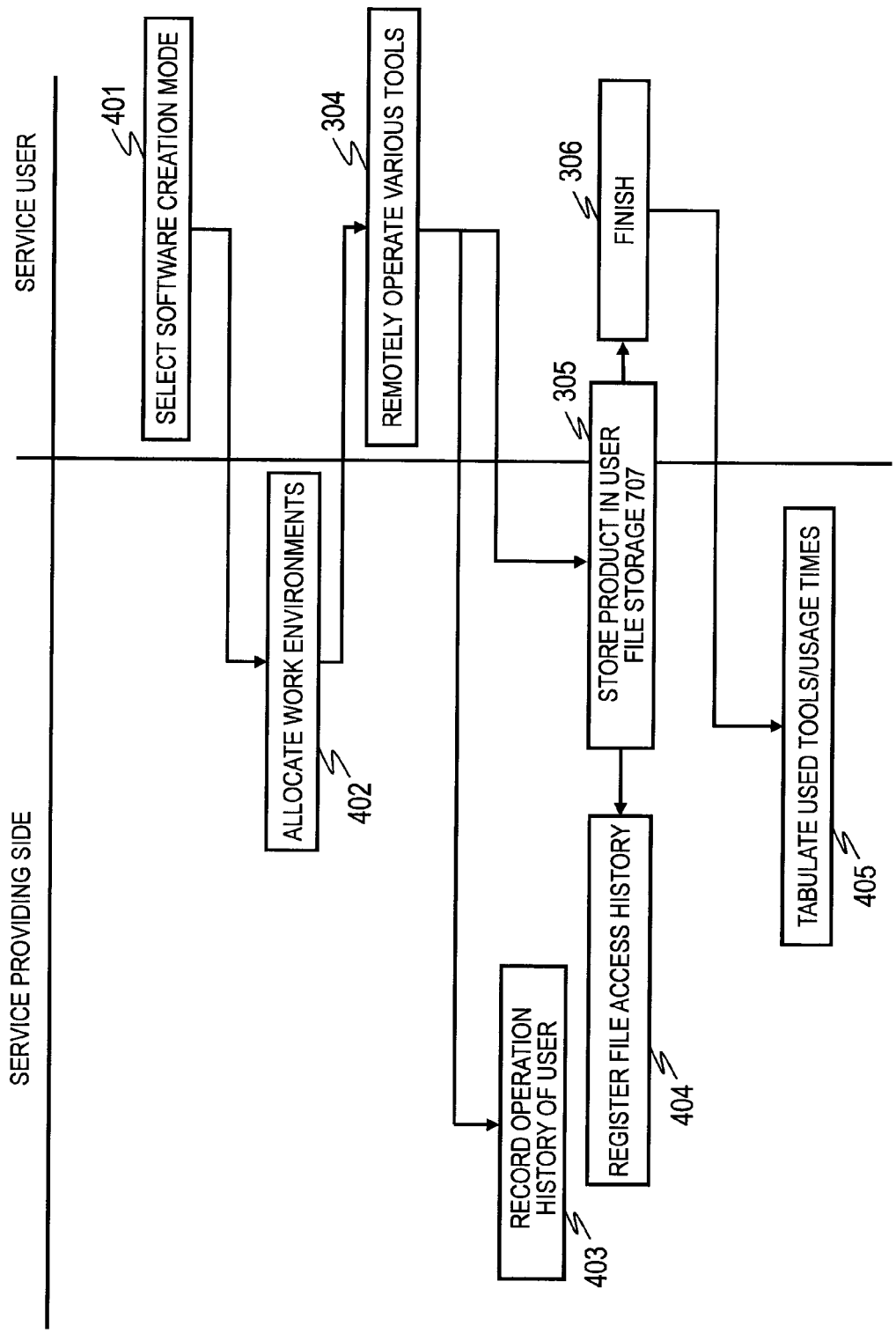
FIG. 4 is a flow chart showing the first embodiment of the present invention and an example of a process in a software development mode.

FIG. 4 shows a process flow of the present system in the software creation mode 315. Using FIGS. 4 and 3, the process of the present system in the software creation mode 315 is described in detail. The software mentioned here indicates the software of the embedded system to be developed by the user, simulation models necessary in executing a simulation, and the simulation result visualization system 102.

In Step 401, the user terminal 107 selects the software creation mode. In Step 402, the work computer system 106 allocates a work environment suitable for the user using the user terminal 107. By this allocation, the user terminal 107 can use a tool/model database 709 and the like of the dynamic computational resource distribution system 100 via the work computer system 106. The work computer system 106 is composed of work computational resources 722, a user file storage 707 and a work environment providing device 703 to be described later.

In Step 304, the user develops the software by remotely operating the above allocated work environment from the user terminal 107. In Step 305, a design file and the like created by the user are stored in the user file storage 707. A change made to the user file storage 707 by the user at this time is registered as a file access history in an operation history database 708 for recording a GUI operation and a file history by a file history recording device 714 in Step 404.

In Step 403, the GUI operation of the user in the user terminal 107 in the work environment provided by the work computer system 106 is obtained by a user behavior statistics device 713 to be described later and registered in the operation history database 708. The registered GUI operation history is used to visualize the development progress and used as statistical information of the software usage status.

When the user of the user terminal 107 finishes the development of the software and selects the termination of the work environment in Step 306, the user behavior statistics device 713 obtains a difference between login time to the work environment and logout time therefrom as a usage time using the function of the OS of the user terminal 107. The obtained usage time is registered in a resource usage management database 711 for recording the system loads in the present system and used to calculate the usage fee of the software creation mode 315 in Step 405.

The user file storage 707 of the work computer system 106 is a file storage area arranged on the network and design files created in the software creation mode 315 and simulation log files in the simulation mode 316 are stored therein.

The user file storage 707 is divided into small areas allocated to each user or each group to which the user belongs. Note that the user file storage 707 is classified according to transfer performance and capacity, and a storage usage unit price used at the time of calculating the system usage fee also differs depending on the class.

A used amount or allocated amount is registered in the resource usage management database 711 in advance for each small area (e.g. block) by the function of a storage system constructing the user file storage 707 and used in calculating the system usage fee for the user.

An administrator of the present system maintains the confidentiality of the present system by setting access authorities of the users to read from, write in and refer to an arbitrary small area in advance.

The work computational resources 722 are configured to include a computer in which one or more OSs (Operating Systems) operate. The work computational resources 722 are in a state where the software provided to the present system is usable. For the types of the OSs used to construct the work environment, a widely or publicly known technology may be used. Typically, a plurality of types of OSs are used to enable the operation of all the software provided to the present system.

Further, since the simulator or software used by the user terminal 107 differs, the setting of the OSs provided to the user terminal 107 is typically widely ranging.

With a normal configuration to provide one OS for one computer, the number of computers required to meet the above request increases. However, by using visualization software enabling a plurality of OSs to operate on one computer such as VMWare, the number of computers necessary for the work computational resources provided by the work computer system 106 can be reduced.

Further, the work computational resources 722 requires a function of obtaining the login time of the user terminal 107, the logout time of the user, the number of usage, usage time and used functions for each type of software used by the user. To realize a function of obtaining these pieces of information, a case where the functions provided by the OSs are used and a case where introduction of software complementing functions not provided by the OSs is necessary are thought. A widely or publicly known technology may be used to realize the functions.

The work environment providing device 703 is a computer which selects an optimal OS configuration from the work computational resources 722 based on the type of the OS meeting the request of the user operating the user terminal 107 and the type of the software used, couples it with the corresponding user area in the user file storage 707 and provides the resultant to the user.

Two methods can be adopted as a method for realizing the coupling of the work computational resources 722 and the user file storage 707. According to one method, after one or more dedicated work environments are allocated to all the users from the work computational resources 722, changes made to the work environments by the users during the works other than products stored in the user file storage 707 are also stored in the work environments so as to be reusable in the future usage.

According to the other method, when all the users use the same work environment, changes made to the work environment by the users other than products stored in the user file storage 707 are discarded. In the present invention, a widely or publicly known technology may be used for the method for providing a work environment except in that products are registered in the user file storage 707.

At least two methods are possibly adopted as a method for connecting the user file storage 707 and the work environment. According to one method, the user file storage 707 is mounted as a disk area in which only the user can write on the OS constructing the work environment. According to the other method, the user file storage 707 is not mounted on the OS constructing the work environment and the user is let to actively copy the design file in the user file storage 707.

Figure 5:
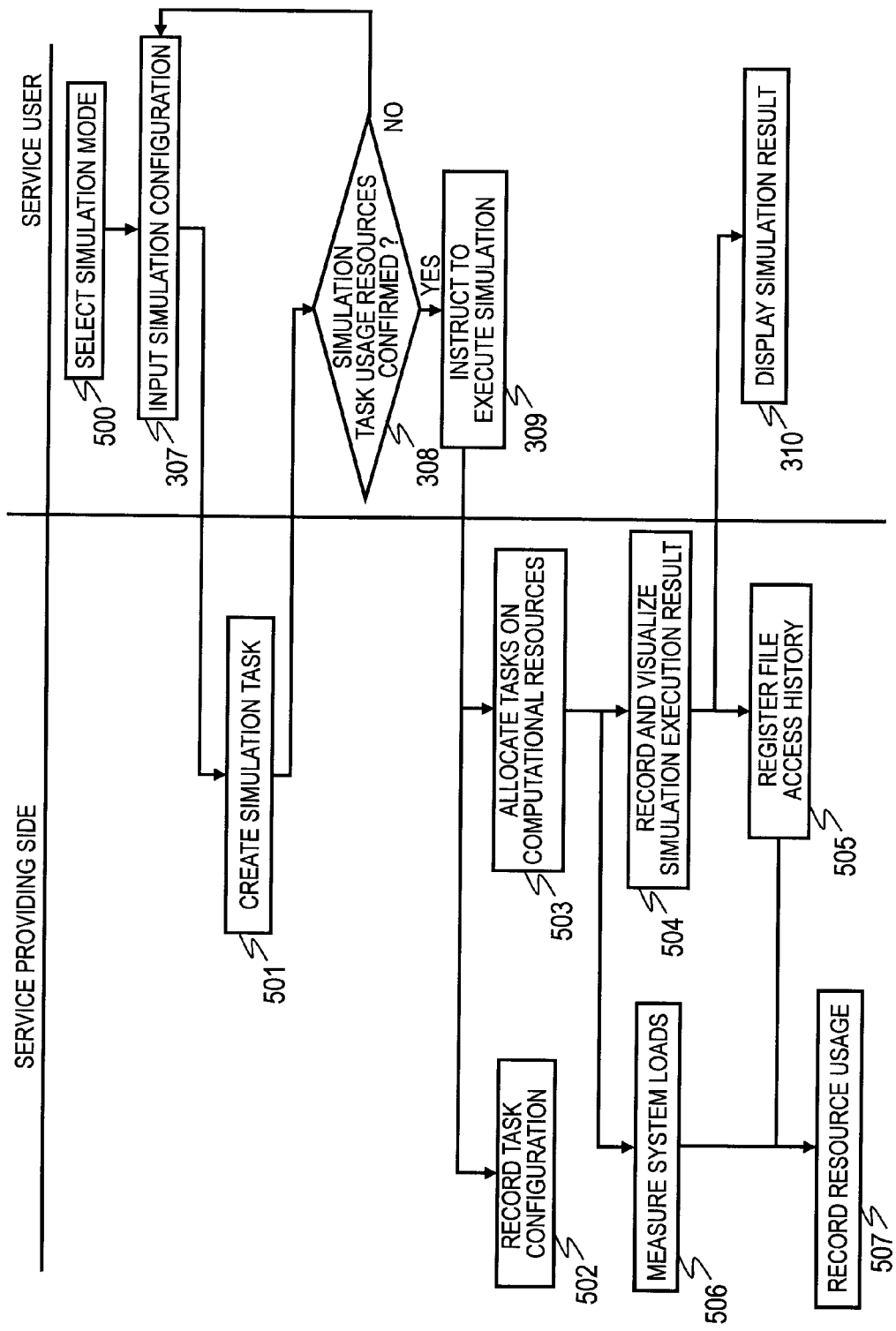
FIG. 5 is a flow chart showing the first embodiment of the present invention and an example of a process in a simulation mode.

FIG. 5 shows a process flow of the present system in the simulation mode 316. Using FIGS. 5, 2 and 3, operations in the simulation mode 316 are described in detail.

When the user terminal 107 selects the simulation mode 316, a simulation is executed by the dynamic computational resource distribution system 100, the simulation computational resources 101 and the simulation result visualization system 102.

The dynamic computational resource distribution system 100 is composed of a simulation task input device 704, a simulation task creating device 705 and a simulation task issuing device 723. Note that although these devices are independent computers in FIG. 3, a program for realizing functions of these devices may be executed in one computer.

The simulation result visualization system 102 is configured to include the simulation result visualization unit 715 allocated by the simulation task creating device 705, and the simulation result visualization unit 715 is connected to a screen data transmitting device 701 of the screen data transmission system 104.

In Step 307 of FIG. 2, the user terminal 107 creates a simulation configuration desired by the user using the simulation task input device 704.

When construction of a simulation object using the simulation task input device 704 is finished, a control of FIG. 5 is started. In Step 501, the simulation task creating device 705 of the dynamic computational resource distribution system 100 estimates computational resources necessary to execute the simulation configuration received from the user terminal 107.

Thereafter, in Step 308, the dynamic computational resource distribution system 100 presents necessary time and cost calculated by the simulation task creating device 705 and the simulation configuration allocated to the computational resources (cluster node 1400 of FIGS. 13, 14) to the user terminal 107.

The user using the user terminal 107 returns to Step 307, adjusts parameters in the simulation task input device 704 and requests an estimate to the simulation task creating device 705 again if information presented from the dynamic computational resource distribution system 100 falls short of his desire.

On the other hand, if the time and cost necessary to execute the simulation and presented to the user terminal 107 by the simulation task creating device 705 meet the user's desire, the user instructs the simulation task issuing device 723 to execute the created simulation task from the user terminal 107 in next Step 309.

When the user terminal 107 instructs the simulation task issuing device 723 to execute the simulation task, the simulation task issuing device 723 secures a necessary number of CPUs and a minimum number of cluster nodes to satisfy a memory amount out of the simulation computational resources 101 in accordance with a command list 1202 generated as the simulation task configuration and illustrated in FIG. 23 in Step 503.

Licenses of all the software necessary for the simulation configuration input from the user terminal 107 are secured by a license server 724 to be described later and the simulation is started.

Figure 13:
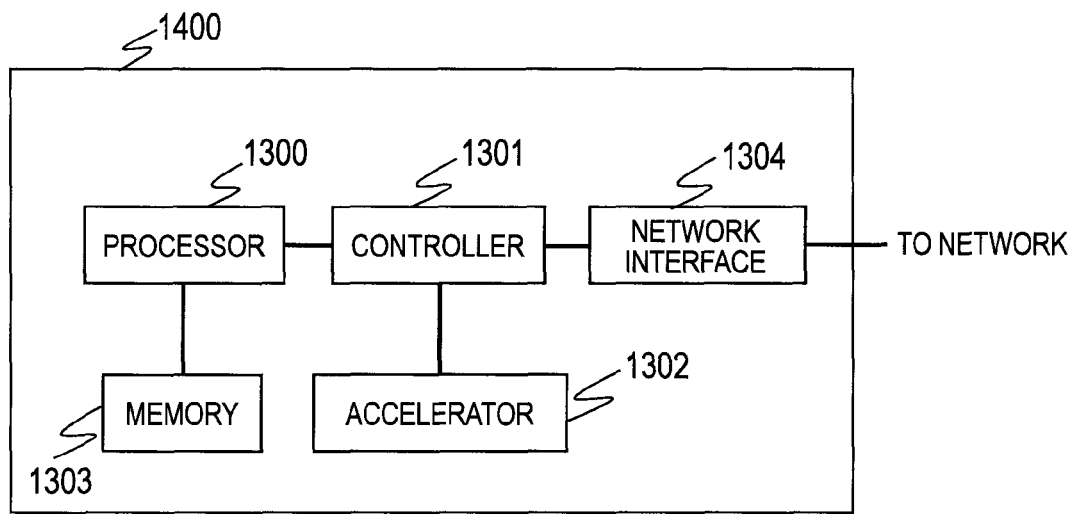
FIG. 13 is a diagram showing the first embodiment of the present invention and a configuration example of a cluster node constituting simulation computational resources.
Figure 14:
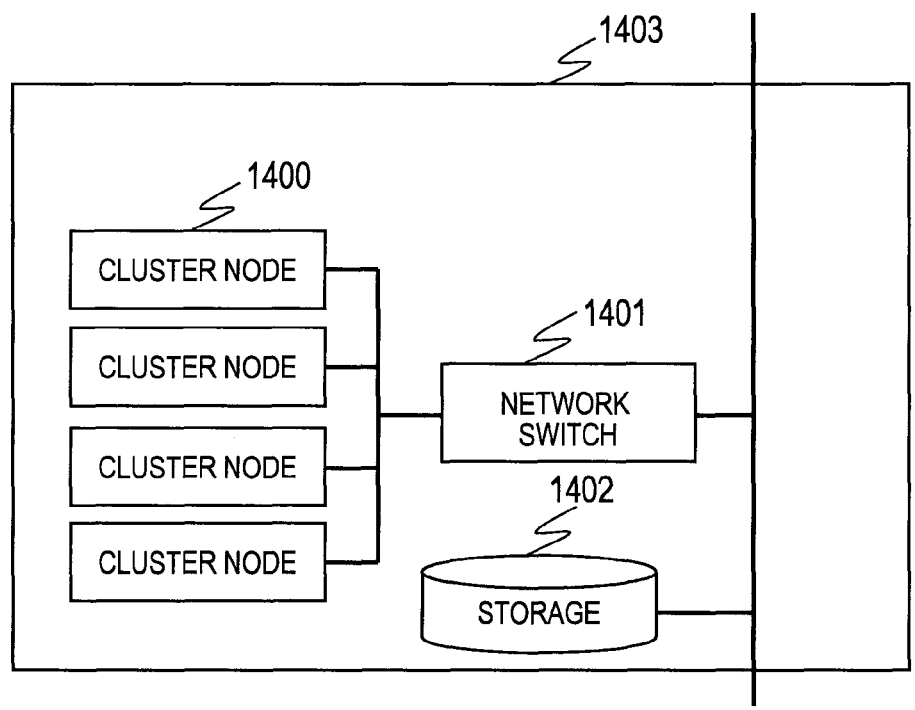
FIG. 14 is a block diagram showing the first embodiment of the present invention and an example of the simulation computational resources.

In Step 504, the simulators executed by the cluster nodes 1400 of the simulation computational resources 101 shown in FIGS. 13, 14 proceed with the simulation while exchanging data with each other.

At that time, the simulation result visualization unit 715 of the simulation result visualization system 102 accumulates data received from one or more simulators (cluster nodes 1400) and processes the accumulated data to obtain a graph designated from the user terminal 107 in Step 310.

If it is designated to present data processed by the simulation result visualization unit 715 in real time to the user terminal 107, the simulation result visualization unit 715 provides the user terminal 107 with data visualizing the simulation (graph or the like) via the screen data transmission system 104.

If real-time presentation is not designated, the simulation result visualization unit 715 retains the processed data in the user file storage 707. In response to a request from the user terminal 107, the simulation result visualization unit 715 provides the visualized data from the user file storage 707.

A load on the present system during the execution of the simulation is recorded in the system load/user behavior monitoring system 103 by the following process.

Loads on the CPU and the memory of the cluster node 1400 to which the simulation task configuration is allocated are measured in the simulation computational resources 101 in Step 506 shown in FIG. 5, and a simulation log is recorded in Step 505. Data are recorded as a resource usage amount in the resource usage management database 711 of the system load/user behavior monitoring system 103 shown in FIG. 3.

The system load during the execution of the simulation stored in the resource usage management database 711 is analyzed together with behavior information of the user terminal 107 after the execution of the simulation stored in the operation history database 708. An analysis result is fed back to a task creation algorithm of the simulation task creating device 705 to improve accuracy in creating the simulation task configuration.

Two methods are possibly adopted as a method for presenting the simulation mode 316 to the user. According to one method, similar to the software creation mode, the task input device 704 and the simulation result visualization unit 715 out of the simulation computational resources 101 are respectively mounted as independent applications and a work environment for simulation execution is allocated.

According to the other method, the task input device 704 and the simulation result visualization unit 715 are presented as applications on a web browser. In the present invention, any widely or publicly known technology may be used for the method for presenting the task input device 704 and the simulation result visualization unit 715 to the user.

The license server 724 of the dynamic computational resource distribution system 100 is a computer holding a license key necessary to start the software introduced to the simulation computational resources 101.

Normally, the start of commercial software is limited by license authentication to prevent illegal copying. Two methods can be adopted as a method for limiting the start of software by license authentication. According to one method, authentication is performed in each computer using information specific to the computer, for example, an individual identifier of a network interface or that of a hard disk. According to the other method, authentication is performed by one computer and the other computers obtain a license from the authenticated computer.

In this embodiment, the method using the license authentication by the license server 724 is described. However, a widely or publicly known technology may be used for the method for providing authentication in the present invention. Generally, in an environment which includes simulation computational resources composed of a multitude of computers and in which software to be executed is dynamically changed as in this embodiment, the former authentication for each computer increases cost to administrate the computers since the number of necessary licenses increases.

Figure 7:
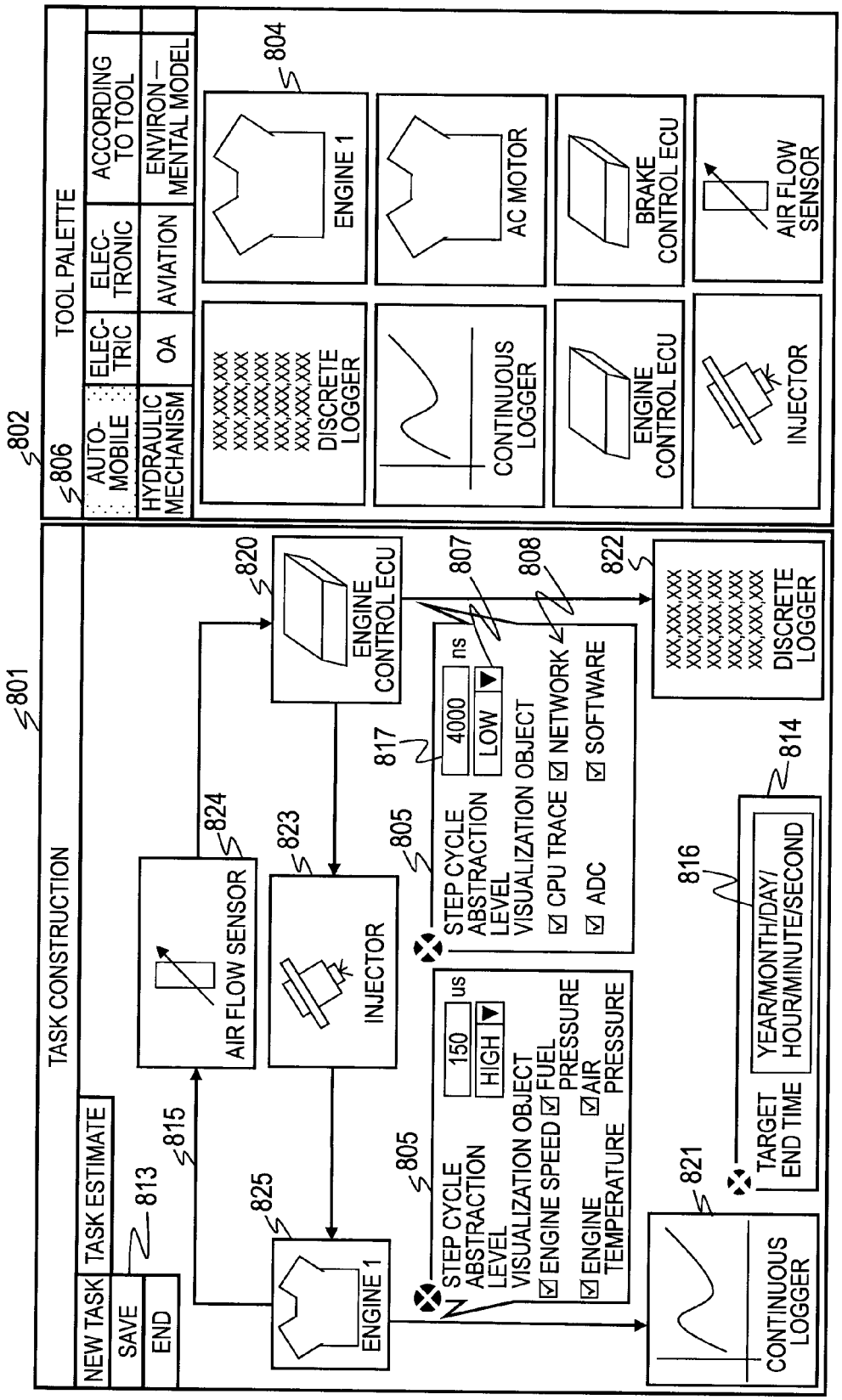
FIG. 7 is a diagram showing the first embodiment of the present invention and an example of a screen image of a simulation task input device.

FIG. 7 shows an example of a typical configuration of the simulation task input device 704 of the dynamic computational resource distribution system 100. The simulation task input device 704 is mounted as a computer for executing a GUI application with a task configuration display region 801 and a tool palette 802.

The tool palette 802 includes all simulation models usable for simulation configuration as a plurality of part blocks 804 and each part block 804 is composed of one simulation model or a collection of simulation models. Assuming that a multitude of simulation models are registered in the tool palette 802, the simulation models may be so mounted as to be displayed in a divided manner according to the type thereof in menu 806.

In an embodiment of FIG. 7, classification by fields of application such as automobile, aviation, OA and hydraulic machine, classification by physical layers of simulation objects such as electronic and environmental model or classification by simulators for executing simulation models to be described later are presented. In FIG. 7, the field of automobile is selected from the menu 806, and simulation models of mechanical parts in an embedded system of an automotive vehicle such as an engine and a motor, driving parts such as an injector and a sensor and electronic parts such as a controller are displayed.

The user can arrange the part blocks 804 selected from the tool palette 802 on the task configuration display region 801 and describe an inter-part connection relationship among part blocks 820 to 825 arranged on the task configuration display region 801 using arrow lines 815. At this time, the user need not expressly designate by which software each of the part blocks 820 to 825 is executed and to how many I/O interfaces they are connected. Further, the user can cause a parameter setting display region 805 to be displayed for each of the part blocks 820 to 825 arranged on the task configuration display region 801 using the user terminal 107.

The parameter setting display region 805 displays standard operation parameters of the parts 820 to 825 at first, and the user can appropriately change the operation parameters in conformity with the simulation configuration using the user terminal 107. Examples of the operation parameters of the models include a step cycle 817 for updating an event, an abstraction level 807, internal data 808 desired to be visualized by the user, and the like.

The simulation result visualization unit 715 for visualizing data is allocated to the simulation environment by being inserted into the part, the internal state of which is desired to be monitored, or connection between the parts on the task configuration display region 801. Further, which presentation method is used at that time can be abstractly selected.

In this embodiment, the user designates allocation of a continuous type graph visualization unit 811 for visualization of the engine block 825 and allocation of a discrete type graph visualization unit 821 for visualization of the internal state of the engine control ECU 820 as shown in FIG. 7.

On a setting display region 814 for parameters relating to the overall simulation configuration, the user sets parameters used by the simulation task creating device 705 at the time of creating a simulation task to be described later.

In this embodiment, the user designates a target end time 816 of the simulation configuration designated from the user terminal 107. Two methods, i.e. a method for designating a time at which the simulation is desired to be finished as in FIG. 7 and a method for designating the elapse of time can be supposed as a method for setting the target end time 813. In the present invention, a widely or publicly known technology may be used for this designation method. As just described, the task configuration display region 801 is a GUI for setting and displaying according to an input from the user terminal 107.

In FIG. 7, the simulation configuration input from the user terminal 107 by the user can be saved. Specifically, the user can save the simulation configuration on the task configuration display region 801 in a simulation configuration history database 721 by pressing a save button 813 on the task configuration display region 801. In saving the simulation configuration, the user can set a disclosure range of the saved simulation configuration, the presence or absence of authority for detailed reference/change of the configuration and ON/OFF of edit items of parameters of the individual part blocks using the user terminal 107.

Figure 8:
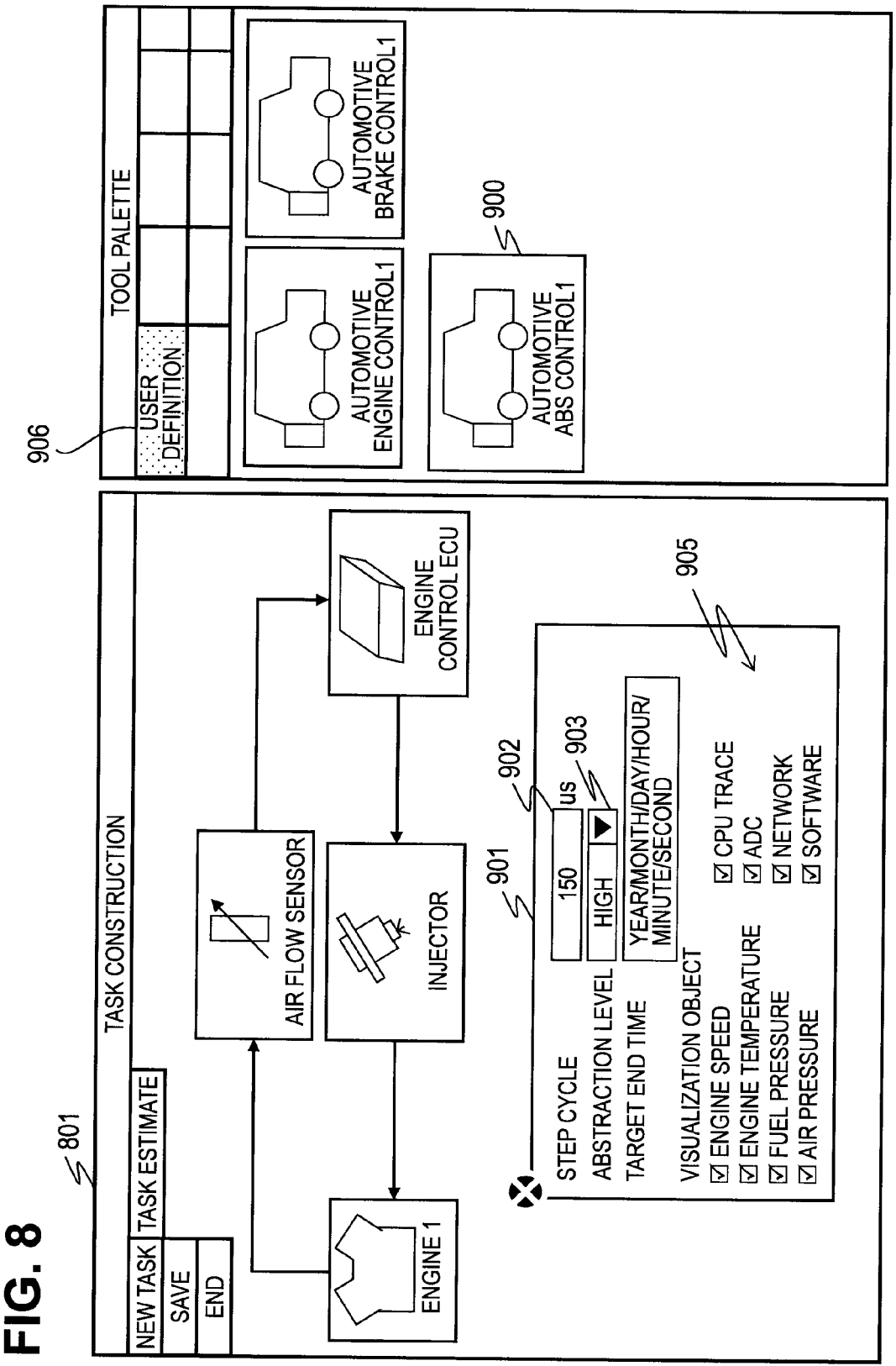
FIG. 8 is a diagram showing the first embodiment of the present invention and an example of a screen image in the case of reusing the configuration of a task created in the simulation task input device.

Hereinafter, the above saved simulation configuration is called a subsystem. FIG. 8 shows a screen presentation example when the subsystem saved in FIG. 7 is reused. By using the subsystem, a created simulation configuration 900 can be reused while being shared by other users.

The simulation configuration 900 saved in the simulation configuration history database 721 by the user is displayed on a user definition menu 906 of the tool palette. If this simulation configuration 900 is arranged on the task configuration display region 801, the simulation environment constructed in FIG. 7 is developed as in FIG. 8 and parameters set by the user who created the subsystem are displayed on a parameter setting screen 901. In this example, the parameters include a visualization object 905, an abstraction level 903 of the entire parts, and a simulation step cycle 902 of each model.

If the user who created the subsystem granted authority for change/reference using the user terminal 107 in advance, a user of the subsystem can refer to/change the detailed parameters of the individual parts constituting the subsystem or add a new simulation model or visualization object in the subsystem.

Figure 9:
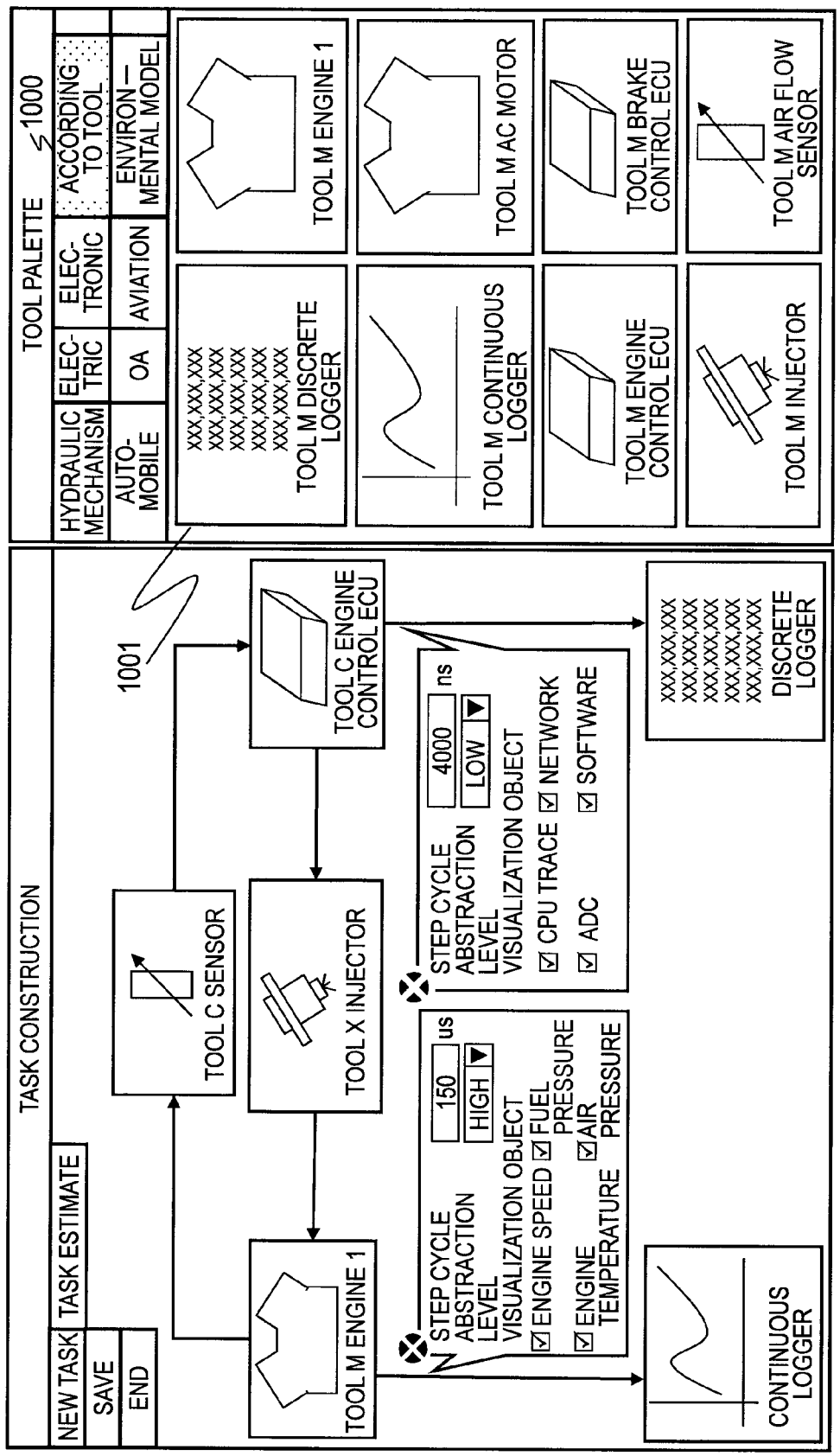
FIG. 9 is a diagram showing the first embodiment of the present invention and an example of a screen image when an abstraction level of a task input decreases in the simulation task input device.

FIG. 9 shows a configuration example when it is necessary to expressly designate software used in the individual parts as simulation objects in the simulation task input device 704 of the dynamic computational resource distribution system 100. FIG. 9 differs from FIG. 7 in that tools of all the parts displayed on a tool palette 1000 are designated. A method for arrangement on the task configuration display region 801 and a method for setting operation parameters are common to the above case of FIG. 7.

According to the present invention, the configuration of the simulation task input device 704 may include all or some of the configuration example of FIG. 7, that of FIG. 8 and that of FIG. 9 without being limited to any one of them.

Figure 10:
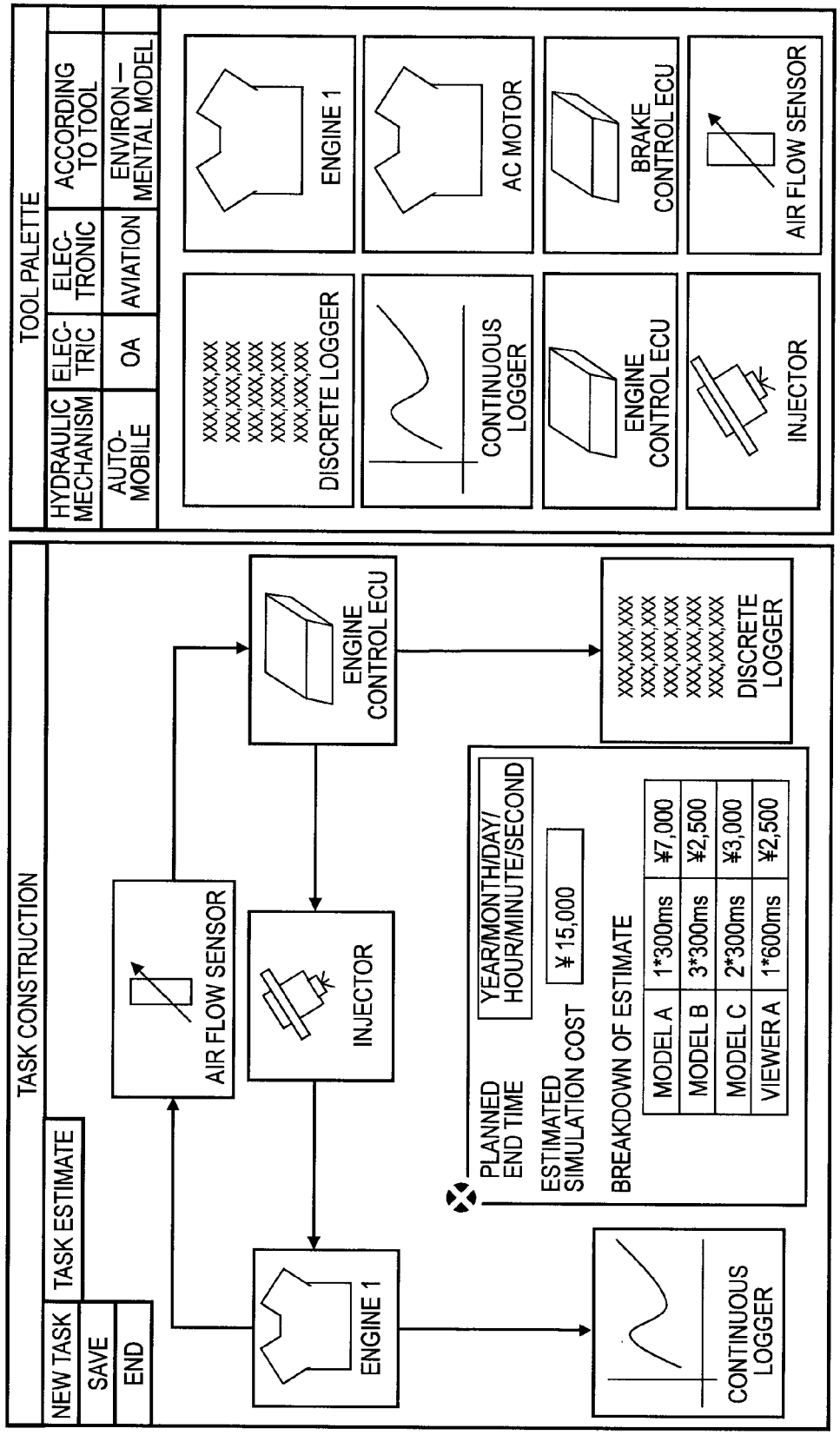
FIG. 10 is a diagram showing the first embodiment of the present invention and an example of a screen image presenting a simulation task configuration created by the task input device.

FIG. 10 shows a screen image showing an example of a user interface of a simulation task. This user interface presents an allocation result of the simulation task configuration to the simulation computational resources 101 to the user terminal 107. In this embodiment, the screen display of the simulation task input device 704 is reused and a planned end time of the simulation, total cost for the simulation and its breakdown are displayed on this screen.

Two methods, i.e. a method for designating a time at which the simulation is desired to be finished as in FIG. 10 and a method for designating the elapse of time are supposed as a method for presenting the planed end time of the simulation. In the present invention, a widely or publicly known technology may be used for this designation method. Further, a method for presenting a computational resource allocation result is not limited to the method shown in FIG. 10.

The task creation operation described in from FIG. 7 to FIG. 10 is defined to be an operation of receiving a created simulation configuration as an input from the user terminal 107 using the simulation task input device 704 of the dynamic computational resource distribution system 100 and converting it into an executable sequence of a simulation task configuration.

In creating the simulation task configuration, parameters of the simulation or computer configuration are adjusted in conformity with the granularity of a simulation model and characteristics of a simulator for executing the simulation model.

The granularity of the simulation model is the size of a minimum unit in the simulation model. A abstraction level largely differs depending on the simulation model, for example, between modeling with a low abstraction level such as a signal line level in SystemC and modeling with a high abstraction level such as a data communication level. This largely changes computation amount necessary for execution of a simulation and communication traffic between parts in a directly coupling relationship.

Generally, the lower abstraction level a simulation model has, the more computation amount and communication traffic are necessary, but it is possible to obtain detailed internal information. On the other hand, the higher abstraction level a simulation model has, the less computation amount and communication traffic are necessary, but time accuracy is low and only a limited internal state can be obtained.

In the case of connecting two or more simulation models having different granularities, it is necessary to synchronize data between the simulation models at regular time intervals. If connection is made without optimization here, the simulation is executed with the granularity of the coarse model and the overall simulation speed is reduced.

Thus, a technique for improving the overall simulation speed by optimizing a synchronization cycle of data in conformity with a site where the simulation is desired to be visualized is important. However, optimization of the synchronization cycle cannot be conclusively estimated before execution of the simulation. Therefore, in the present system, a technique for optimizing a simulation configuration is adopted which treats the configuration of a simulation executed in the past and system loads at the time of executing this simulation configuration as learning data.

FIG. 11 shows an example in which a simulation task configuration 1101 is created by setting a simulation of the engine control ECU as a simulation task in the case of developing a control system for an internal combustion engine as an embedded system. Software for executing each simulation (execution tool in FIG. 11), a model for executing the simulation (used model in FIG. 11), parameters to be used (used parameters) and identifiers of the cluster nodes 1400 for executing the simulations (execution node in FIG. 11) are allocated to the engine control ECU, the air flow meter, the injector and the engine as simulation elements.

Figure 12:
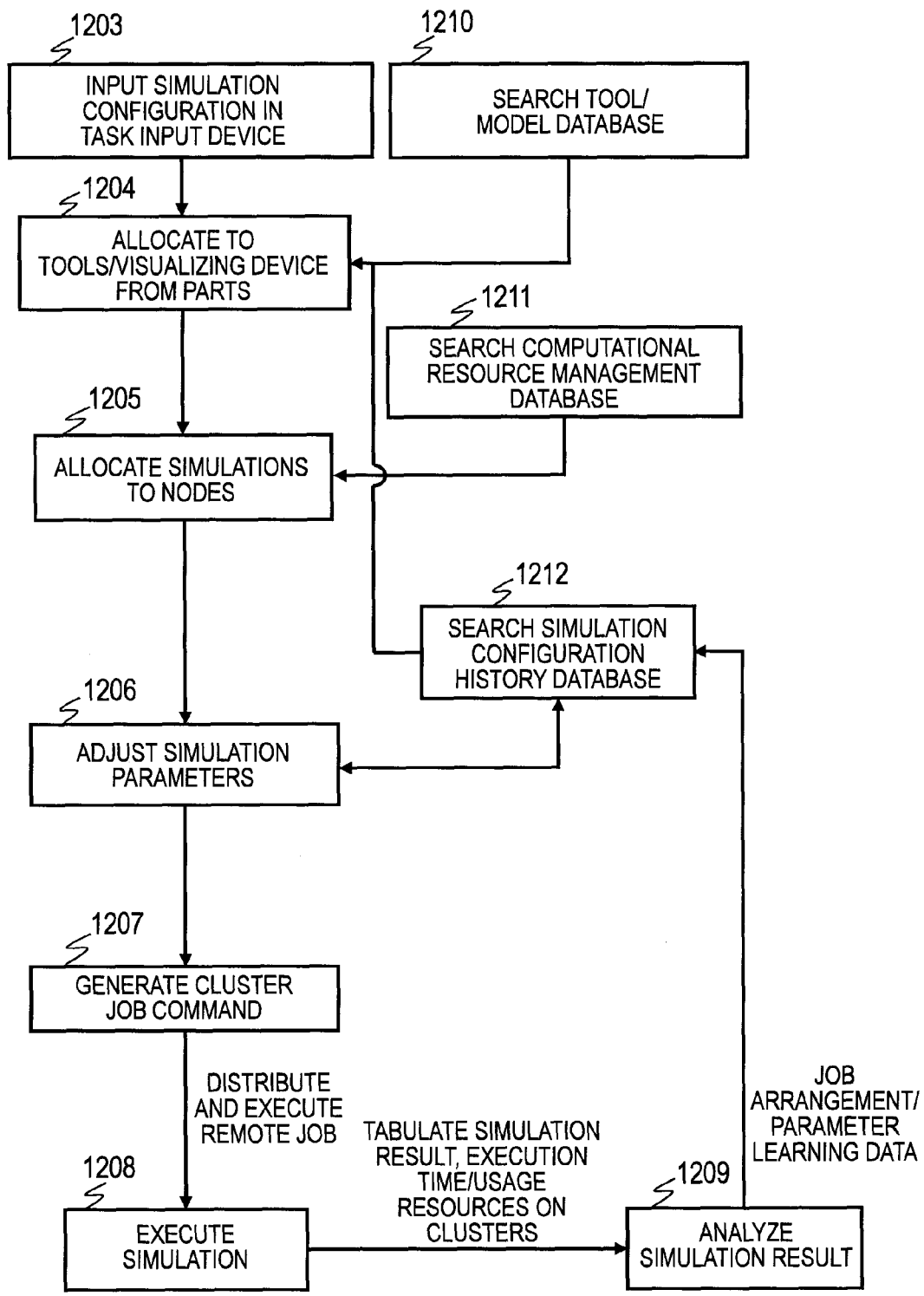
FIG. 12 is a flow chart showing the first embodiment of the present invention and task creation by a simulation task creating device.

FIG. 12 shows a flow chart of task creation by the simulation task creating device 705 of the dynamic computational resource distribution system 100. This corresponds to Step 501 of creating the simulation task and Step 502 of recording the task configuration in FIG. 5. A task creation process of the simulation task creating device 705 is described below.

In Step 1203, the simulation task creating device 705 creates a task using a simulation configuration created using the simulation task input device 704 as an input.

In Step 1204, the simulation task creating device 705 relates the parts included in the simulation configuration to the simulators to be executed respectively. In relating the parts and the simulators, the types of the simulators (simulation software) necessary to execute the respective parts included in the simulation configuration and information on the granularities of simulation models are obtained by a search (Step 1210) in the tool/model database 709 in which information on the simulation models used in the simulation configuration is recorded.

In obtaining, the simulation task creating device 705 refers to the simulation configuration history database 721 in which the simulation task configurations executed in the past are recorded (Step 1212). In finding out a history of execution of an equivalent configuration, it is possible to reuse the history data of the simulation configuration history database 721 without referring to the tool/model database 709.

Subsequently, in Step 1205, the simulation task creating device 705 allocates tasks of the simulators and the simulation models to the simulation computational resources 101. At this time, a computational resource management database 706 is referred to (Step 1211). Specifically, the tasks of the simulators and the simulation models are allocated to the simulation computational resources 101 to simulate the individual parts of the simulation configuration based on requested computation amounts and communication traffics of the individual parts, and information on computation capability and communication capacity of the simulation computational resources 101 and usage statuses of computational resources recorded in the computational resource management database 706 to be described later.

In task allocation, whether to arrange the cluster nodes 1400 at close positions or at distant positions is determined according to the volume of the communication traffic between the parts. Further, the tasks with huge communication traffic are allocated to the same node. Further, since execution times and data are synchronized between the parts by TCP/IP communication, port numbers used in data communication are also allocated.

Further, the simulation task creating device 705 also couples the simulation result visualization unit 715 and a user interface for presenting the simulation mode in the case of including the simulation result visualization unit 715 that needs to keep displaying a result during the execution of the simulation.

When allocation of the simulation tasks to the simulation computational resources 101 is completed, the simulation task creating device 705 adjusts parameters of the individual simulation tasks in next Step 1206.

Adjusting the parameters of the simulation tasks includes referring to the simulation configuration history database 721 to searching for histories of parameters of the simulators when a simulation having similar parts, coupling relationship of the parts and cluster arrangement was executed for combinations of the simulators and the simulation models (Step 1212).

If a result corresponding to the above search conditions is found, parameters of this simulation are used. If no search result is found, similar configuration histories in the parameters input in the simulation task input device 704 and the simulation configuration history database 721 are searched for and simulator parameters obtained from a configuration with a highly effective simulation result are generated.

The effectiveness of the simulation result is a numerical value evaluating whether or not the simulation result indicates an analysis result and an execution speed meeting the user's desire by analyzing the user's behavior after the execution of the simulation. A flow of simulation result effectiveness analysis is described later.

In Step 1207, the simulation task creating device 705 confirms a command list 1202 of the simulation tasks to be executed in the simulation computational resources 101 as illustrated in FIG. 23 by confirming the execution parameters corresponding to each combination of a simulator and a simulation model.

By the above process, the types and numbers of the simulators and simulation visualization units 715, the amount of computational resource, and a coupling relationship of the computational resources necessary for the simulation can be known. Based on these, it can be predicted the amount of time and computational resources required by a similar simulation by referring to the simulation configuration history database 721.

When anticipated values of the time and used resource are calculated, the simulation task creating device 705 calculates anticipated cost of the simulation to be presented to the user from the user terminal 107. The above anticipated values are presented to the user. The present system waits until receiving an instruction to execute the simulation or recreate simulation tasks from the user terminal 107.

If it is instructed to recreate the simulation tasks from the user terminal 107, the simulation task creating device 705 reduces task creation accuracy of the simulation configuration presented to the user terminal 107 and creates simulation tasks again using different generation parameters (simulation elements).

The task creation accuracy is a numerical value given to each simulation task created by the simulation task creating device 705 and calculated by subtracting 1 or adding 1 based on effectiveness evaluation of the user on the executed simulation tasks.

On the other hand, if an execution instruction is given from the user terminal 107, the simulation task creating device 705 transfers the command list 1202 to the task issuing device 723 to start the simulation. A widely or publicly known technology may be used for an estimation algorithm of a degree of similarity between the simulation configuration and the history data in the simulation task creating device 705 except in including the operation flow described with reference to FIG. 12.

In Step 1208, a computing resource load measuring device 712 observes system loads in the simulation computational resources 101 during the execution of the simulation and records its observation result. Specifically, the system loads (e.g. processor utilization rates) of the respective cluster nodes 1400 of the simulation computational resources 101 are obtained and recorded in the resource usage management database.

In Step 1209, the simulation task creating device 705 analyzes the simulation result and the configuration of the executed simulation after execution of the simulation and evaluates the effectiveness of this simulation.

After execution of the simulation, the user confirms the visualized simulation result in the user terminal 107. Which action the user will take according to this result can be obtained by the user behavior statistics device 713.

If it is revealed from the measurement result of the user behavior statistics device 713 that the user receives the simulation result in the user terminal 107 and repeatedly executes the simulation having the same part configuration again while changing the parameters relating to the operations of the simulators, the simulation task creating device 705 determines that the user is not satisfied with automatic allocation capability by the simulation task creating device 705 and reduces the task creation accuracy of the simulation configuration history.

If it is revealed from the measurement result of the user behavior statistics device 713 that the user receives the simulation result in the user terminal 107 and uses the exact same part configuration and simulation operation parameters, the simulation task creating device 705 increases the task creation accuracy of the corresponding simulation configuration history. The simulation task creating device 705 uses the effectiveness of each configuration history entry of the simulation configuration history database 721 so that a highly effective simulation configuration history is used in the future.

By the above mechanism, the simulation task creating device 705 can improve its own task creation accuracy.

Hereinafter, table configuration examples of the databases used in the task creating device 705 and the like are described. The tool/model database 709 is a database for storing information on arbitrary simulation models usable in the present system. A table configuration 1200 of FIG. 19 shows an example of a table configuration of the tool/model database 709.

In this embodiment, the tool/model database 709 stores identifiers (part name in FIG. 19) of the simulation models, identifiers (tool in FIG. 19) of the simulators capable of executing the simulation models, version information (version in FIG. 19) of the executable simulators, granularities of the simulation models (model granularity in FIG. 19) and the numbers of input/output ports of the simulation models as connection information in FIG. 19. This table configuration is a minimum table configuration in realizing the present invention and information to be stored may be further increased.

The computational resource management database 706 is a database for managing the state of the simulation computational resources 101 of the present system. FIG. 24 shows an example of a table configuration of the computational resource management database 706.

In this embodiment, the computational resource management database 706 is a database for storing computing capabilities, node position information, used states, planed return times from the used states and the like of the cluster nodes 1400 constituting the simulation computational resources 101.

In FIG. 24, classes 2401 of the cluster nodes are obtained by classifying the simulation computational resources 101 according to its CPU performance and RAM capacity. The classes of the cluster nodes are used for cost calculation in execution of the simulation to be described later.

In this embodiment, position information of target cluster nodes on the network are stored under node arrangement 2402. In this embodiment, IP addresses are used as position information on the network. The positional relationship on the network can be grasped from the IP addresses and communication traffic can be estimated based on the positional relationship on the network. Generally, the nodes having closer IP addresses can support high communication traffic.

This table configuration is a minimum table configuration in realizing the present invention and information to be stored may be further increased.

The simulation configuration history database 711 of the dynamic computational resource distribution system 100 is a database for storing the configuration of a simulation task created by the simulation task creating device 705, i.e. the types of simulators used in a certain simulation, simulation models, a coupling relationship among the simulators (simulation configuration), parameters used in the simulators and effectiveness of an execution result of the simulation configuration.

FIG. 26A shows an example of a simulation configuration table 2600 of the simulation configuration history database 711. In this embodiment, identifiers of simulations (simulation ID in FIG. 26A), start times (start time in FIG. 26A), target end times and actual end times (actual end time in FIG. 26A) of the simulations, a link to another table storing the simulation configuration (simulation configuration file path in FIG. 26A) and simulation effectiveness are stored.

FIG. 26B shows an example of a simulation configuration table 2601 of the simulation configuration history database 711. In this embodiment, identifiers of simulators configuration (simulation ID in FIG. 26B), simulator types, file storage destinations of simulation models, and identifiers of simulation models which directly exchange data at the time of executing the simulation (neighboring configuration ID in FIG. 26B) are stored. As long as the information shown in FIGS. 26A, 26B is included, a widely or publicly known technology may be used for other parts of the configuration of this database.

The computing resource load measuring device 712 can be realized, for example, by a system status obtaining program as a standard program of the OS introduced by a system provider and installed in the simulation computational resources 101. A widely or publicly known technology may be used for the detail of the computing resource load measuring device 712 except that the execution times of the processes, the CPU loads and the RAM usage amounts can be recorded. As shown in FIG. 3, a program for obtaining the load information of each of the cluster nodes 1400 may be executed by the computer of the system load/user behavior monitoring system 103.

A configuration example of the simulation computational resources 101 is described using FIGS. 13, 14. FIG. 14 shows an example of a minimum structure of a cluster as a constituent element of the simulation computational resources 101. FIG. 13 shows a configuration example of the cluster nodes as constituent elements of the cluster. The simulation computational resources 101 have a cluster minimum structure 1403 in which one or more cluster nodes 1400 and one or more storage systems 1402 are connected to each other via a communication network 1401.

Further, the simulation computational resources 101 can have a structure in which one cluster minimum structure 1403 or a plurality of cluster minimum structures 1403 are connected by the communication network 1401. Any one of LAN (Local Area Network), Internet, WAN (Wide Area Network), dedicated line, wireless network, public network, mobile telephone network can be employed as the communication network 1401, and the type of the network and a connection structure do not matter. A virtual dedicated network technology such as VPN (Virtual Private Network) may be sometimes applied to the communication network 1401.

A configuration example of the cluster node 1400 is described using FIG. 13. A basic configuration of the cluster node 1400 includes elements such as one or more processors 1300, one or more memories 1303, a controller 1301, one or more accelerators 1302, and a network interface 1304. The number of each element and connection relationship of the elements are not limited.

Figure 6:
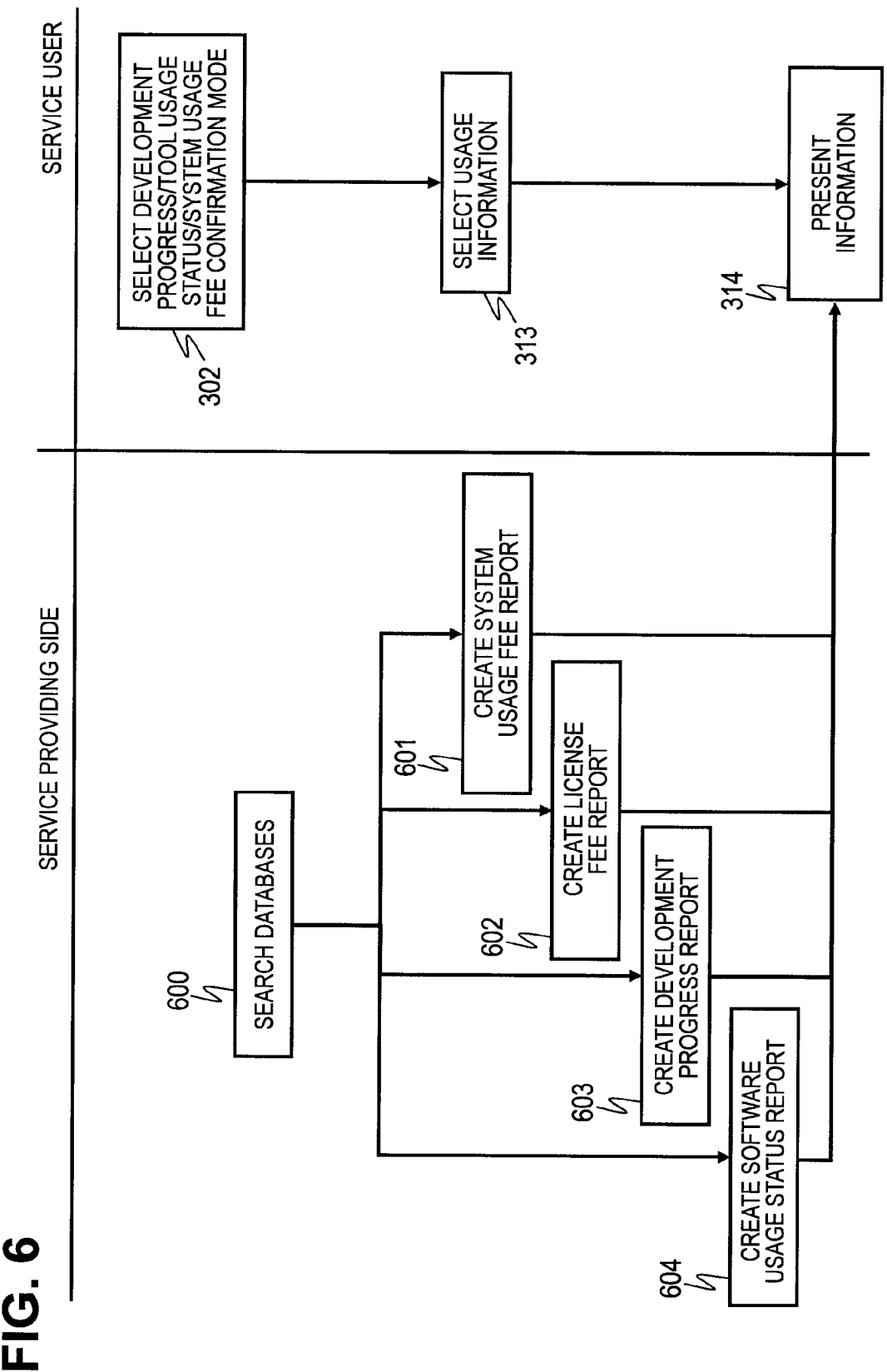
FIG. 6 is a flow chart showing the first embodiment of the present invention and an example of a process in a development progress/tool usage status/system usage fee confirmation mode.

Using FIGS. 6 and 3, an example of a process in the development progress/tool usage status/system usage fee confirmation mode 317 is described.

Information provided in the development progress/tool usage status/system usage fee confirmation mode 317 is regularly analyzed using latest data given by a search 600 of system information at that time by a method to be described later. Specifically, a development progress selecting device 718 in the system load/user behavior monitoring system 103 analyzes the above information using the latest data in creation 603 of a development progress report and creation 604 of a software usage status report. A system usage fee generating device 716 analyzes the above information using the latest data in creation 601 of a system usage fee report and creation 602 of a license fee report.

The development progress report is recorded in a development progress information database 720, the software usage status report is recorded in a tool usage status database 719, and the system usage fee report and the license fee report are recorded in a billing management database 717.

The user who selected the development progress/tool usage status/system usage fee confirmation mode 317 in Step 302 selects the type of the information desired to be confirmed from the development progress report, the tool usage status report and a system usage confirmation report in Step 313.

When the information to be used is selected in the user terminal 107, the present system searches the development progress information database 720, the tool usage status database 719 and the billing management database 717 for the corresponding latest report. If the corresponding report data is found, it is presented to the user terminal 107 via the screen data transmitting device 701 in Step 314.

The user can limit information browsable by the user in advance in concluding a usage contract of the present system. For example, the user who develops using the present system can receive the development progress report and the usage fee information, but cannot browse the license fee information.

A procedure of analyzing information in the system usage fee generating device 716 and the development progress selecting device 718 in the system load/user behavior monitoring system 103 and configuration examples of databases necessary at that time are described below.

Figure 15A:
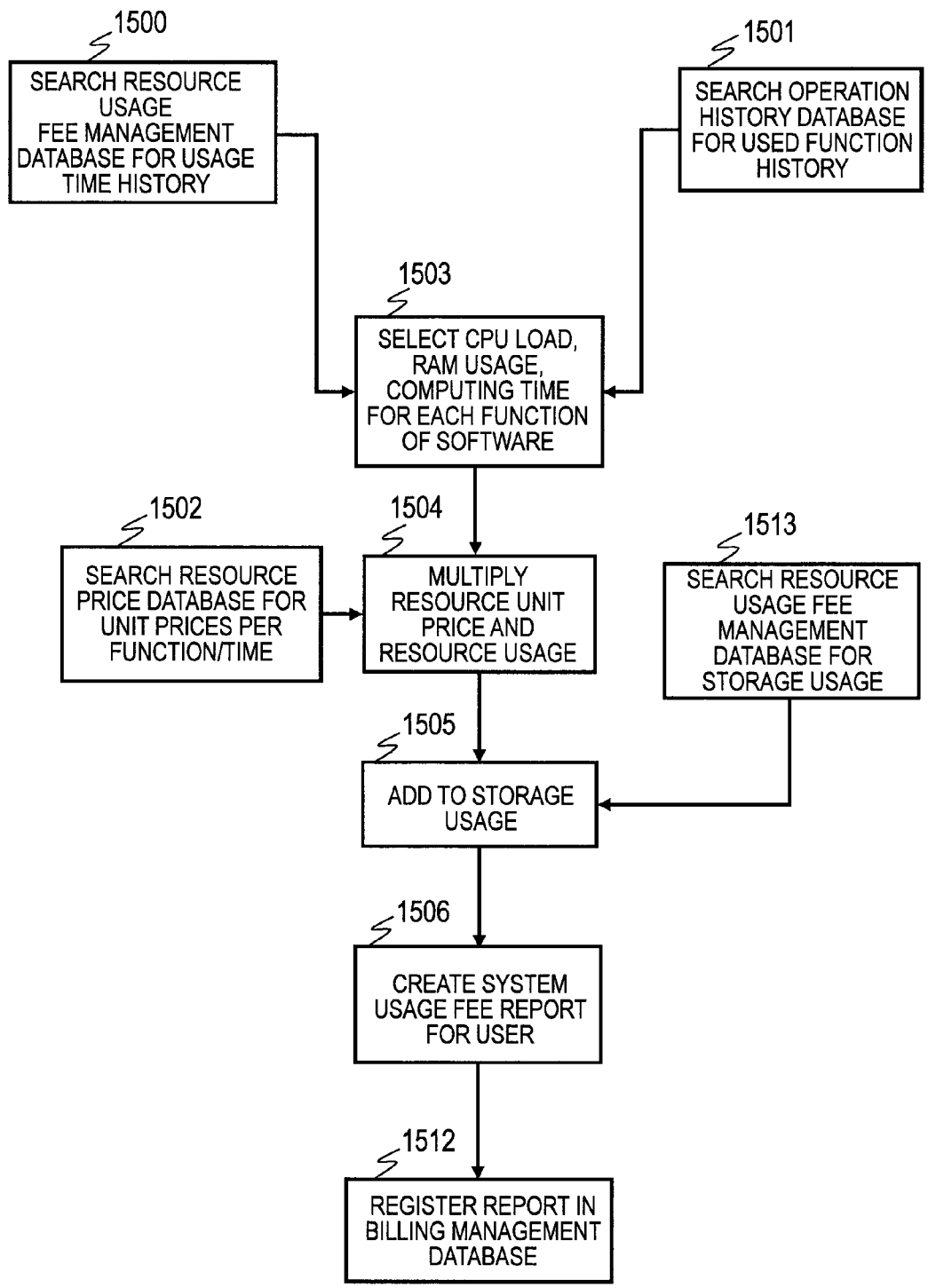
FIG. 15A is a flow chart showing the first embodiment of the present invention and an example of a process of calculating a system usage fee.

FIG. 15A shows a procedure of calculating a usage fee of the present system to be charged to the user using the user terminal 107 and a license fee to be paid to the software provider from the information in the operation history database 708, the resource usage management database 711 and a resource price database 710.

First, a process of calculating the system usage fee to be charged to the user is described. In Steps 1500 and 1501, the system usage fee generating device 716 searches, for each user, the resource usage management database 711 and the operation history database 708 respectively for a load history of the simulation computational resources 101 and a GUI operation history within a usage time by the user of the work computer system 106.

In Step 1503, the system usage fee generating device 716 selects CPU usage, RAM usage and required time of each used function based on a combination of the load history of the simulation computational resources 101 and the GUI operation history of the work computer system 106.

On the other hand, in Step 1502, the system usage fee generating device 716 searches the resource price database 710 for a computational resource unit price and a tool unit price for each tool used from the user terminal 107, using a used computation node as a keyword.

The system usage fee generating device 716 calculates the data collected in above Steps 1502, 1503 in accordance with the following equation in Step 1504:

(CPU usage×RAM usage×computational resource unit price+tool unit price)×usage time.

This equation is equivalent to a calculation of multiplying the usage of the computational resources by the usage unit price of the computational resources. The system usage fee generating device 716 calculates and tabulates the system usage fee corresponding to the usage of the functions of the present system for each user of the user terminal 107.

Subsequently, in Step 1513, the system usage fee generating device 716 searches the resource usage management database 711 for the storage usage of the user of the user terminal 107 and searches the resource price database 710 for the storage unit price. Further, in Step 1505, the storage usage and the storage unit price are multiplied and the multiplication result is added to the system usage fee as the storage usage fee. The resource price database 710 is described later.

By Step 1505, the system usage amount for the user is given by:

$$\sum_{UsedTool} TaskRequiredTime \times \quad \text{[Equation 1]}$$
$$(ComputationalResourceUnitPrice \times CPUUsage \times$$
$$RAMUsage + ToolFunctionUnitPrice) +$$
$$StorageUsage \times StorageUnitPrice$$

In Step 1506, the system usage fee generating device 716 compiles the total and particulars of the system usage fee added with the storage usage fee calculated above and creates a system usage fee report 2700 as illustrated in FIG. 27. Finally, in Step 1512, the created system usage fee report 2700 is registered in the billing management database 717.

Figure 15B:
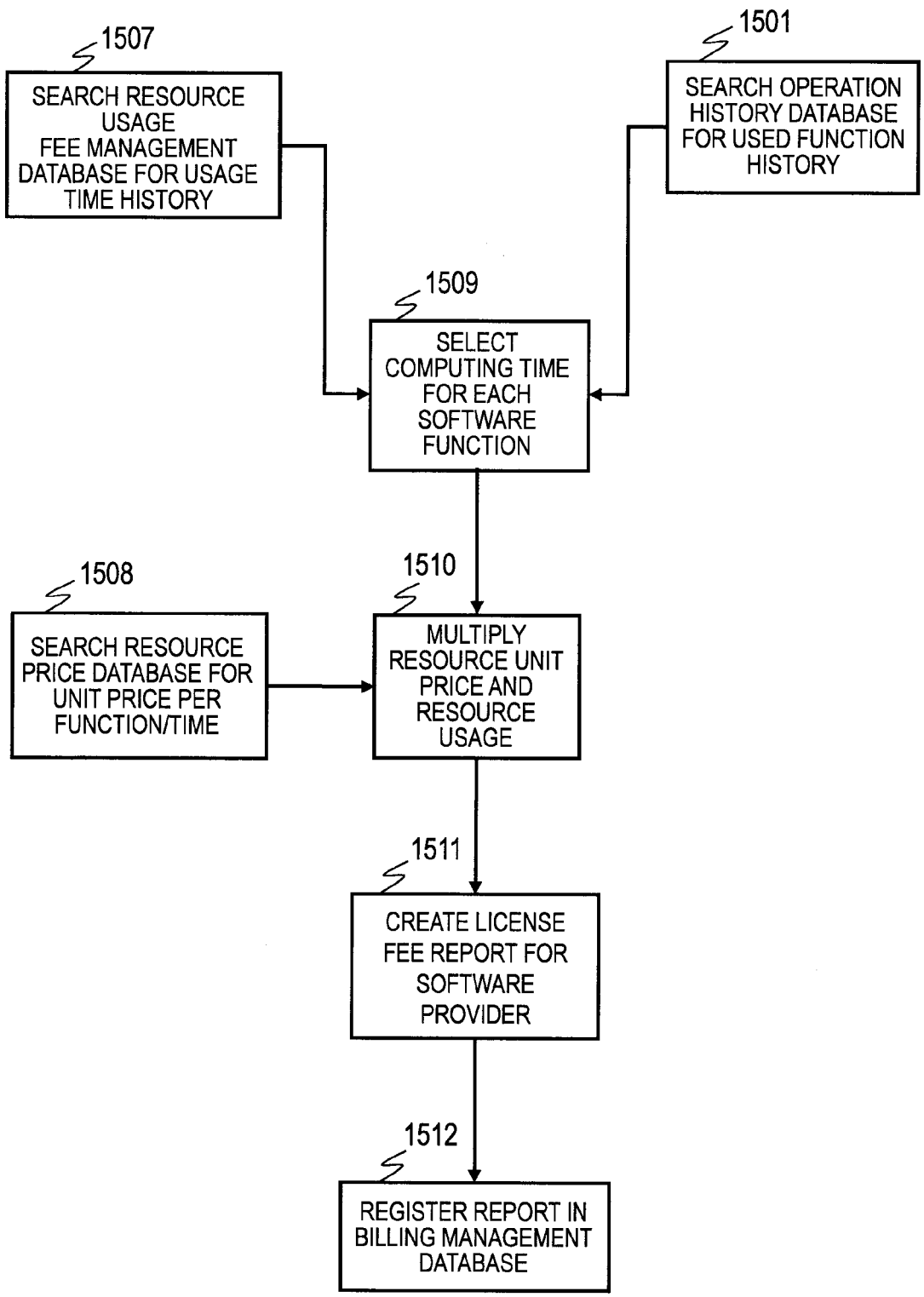
FIG. 15B is a flow chart showing the first embodiment of the present invention and an example of a process of calculating a license fee.

Next, a process of calculating the software license fee to be paid to the software provider is described using FIG. 15B. In Steps 1507 and 1501, the system usage fee generating device 716 searches the resource usage management database 711 and the operation history database 708 respectively for a load history of the simulation computational resources 101 of each software and a GUI operation history within a usage time by the user of the work computer system 106.

Subsequently, in Step 1509, a minute required time of each used function is selected based on a combination of the load history of the simulation computational resources 101 and the GUI operation history of the work computer system 106.

On the other hand, in Step 1508, the system usage fee generating device 716 searches the resource price database 710 for a software usage unit price using the function of the software as a keyword and multiplies it by the required time selected above. By Step 1510, the software license fee to be paid to the software provider is calculated by:

$$\sum_{UsedTool} TaskRequiredTime \times ToolFunctionUnitPrice \quad \text{[Equation 2]}$$

In Step 1511, the system usage fee generating device 716 compiles the total and particulars of the calculated software license fee and creates a license fee report 2800 as illustrated in FIG. 28. Finally, in Step 1512, the created license fee report 2800 is registered in the billing management database 717.

By the above, the system usage fee generating device 716 creates the system usage fee report 2700 and the license fee report 2800.

Next, the detail of the resource price database 710 described with reference to FIGS. 15A and 15B is described with reference to FIG. 20. The resource price database 710 in the system load/user behavior monitoring system 103 stores contract information on the license fee and the system usage fee concluded with the software provider and the user in advance.

A table configuration example of the resource price database 710 is described using FIG. 20. A storage price table 1730 of the resource price database 710 stores capability, capacity and unit price per unit usage time for each class of storage in the present system.

A cluster node price table 1740 of the resource price database 710 stores the installed CPU, the hardware type, the amount of the installed memory and the unit price per time/unit CPU usage/unit RAM usage for each type of the node.

A tool price table 1750 of the resource price database 710 stores vender information and unit price per function/unit time for each software and each function. Unit price information includes two unit prices, i.e. a unit price to be paid to the software provider and a unit price to be charged to the user.

The resource usage management database 711 in the system load/user behavior monitoring system 103 is a database for recording usage loads on the simulation computational resources 101, the work environment computational resources 722 and the user file storage 707.

FIG. 17 shows a table configuration example of the resource usage management database 711. The resource usage management database 711 is configured to include a storage usage history table 1700 storing a usage history of the user file storage 707 used by the user terminal 107, a system load history table 1710 storing load histories of the cluster nodes 1400 used in the simulation computational resources 101 and a remote OS usage time table 1720.

The storage usage history table 1700 records information including the usage for each storage area secured on the user file storage 707 by the user of the user terminal 107. In this embodiment, user identifiers, used storage amounts and storage class identifiers are recorded.

The storage usage of each user in the user file storage 707 in the work computer system 106 is sequentially monitored by a storage usage tabulation program executed by the system load/user behavior monitoring system 103.

The system load history table 1710 stores system loads of tasks executed on the simulation computational resources 101 by the user of the user terminal 107. In this embodiment, the used software, task start times, task end times, the types of the used cluster nodes, average values and peak values of the CPU usage and the memory usage are recorded.

The remote OS usage time table 1720 records the usage time of the user in the work environment computational resources 722 in the work computer system 106. In this embodiment, the user identifier, the login time to and the logout time from the work environment computational resources 722 are recorded. The operation history database 708 is a database for holding an operation performed on the GUI or file on the present system by the user via the user terminal 107 and a behavior analyzed from the operation history.

FIG. 18 shows a table configuration example of the operation history database 708. The operation history database 708 is composed of a user behavior raw data table 1820 storing a usage history of the present system by the user from the user terminal 107, an event table 1810 storing an analysis result of the user behavior statistics device 713, and a file history table 1800 storing a history of accessing the user file storage 707 from the user terminal 107 for each user.

The user behavior raw database 1820 holds data obtained by the user behavior statistics device 713 from operations of the user on the simulation task input device 704 and the work computational resources 722 as they are. Thus, only an event history of GUI parts of the individual tools such as operations on a mouse, entered texts and the like are recorded in this table 1820.

The event table 1810 stores data obtained by template analysis of data of the user behavior raw data table 1820 and the file history table 1800 by the user behavior statistics device 713.

The user behavior statistics device 713 includes stored computer operations corresponding to a GUI operation sequence (template) as a pair, checks the GUI operation history of the user and the template against each other, and outputs a computer operation event determined to have a highest corresponding probability by a statistical means. In the present application, this checking is called template analysis.

By the template analysis of the user behavior statistics device 713, an operation event for each tool, e.g. which part was handled or which option was selected on the tool can be estimated from the GUI operation history sequence of the user behavior raw data table 1820. In this embodiment, the event table stores the user identifier, the type of the software, the occurrence time of an event and the content of the event.

In this embodiment, a widely or publicly known technology may be used for the user behavior statistics device 713 concerning the algorithm of the template analysis except for the functions described above.

In selecting a development progress status and a tool usage status, the present system regularly analyzes information without receiving a request from the user and stores latest report files in the databases each time. According to an information analysis method of the present system, a process of producing a simulation result as a development result from a software part as a material is estimated from the usage of the tools and accesses to files.

Figure 16A:
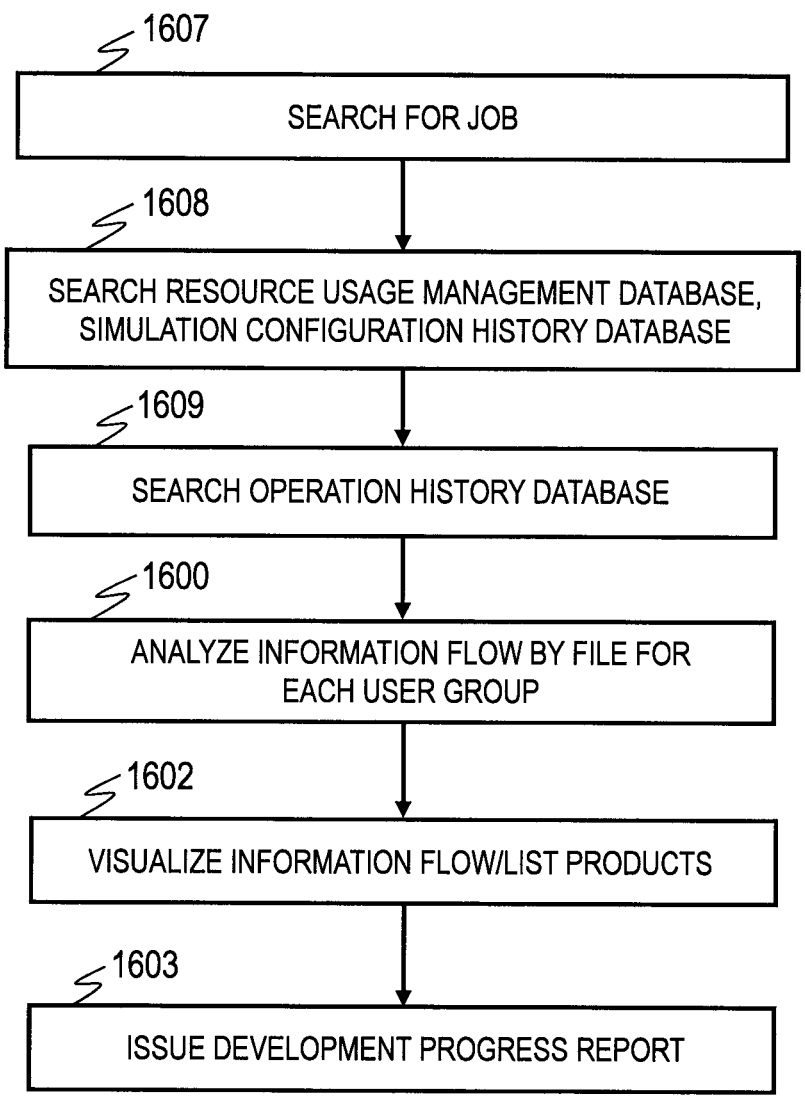
FIG. 16A is a flow chart showing the first embodiment of the present invention and an example of a process of analyzing a development progress.

An example of a process of the development progress selecting device 718 to select a development progress status by referring to a behavior history (operation history database 708) of the user is described using FIG. 16A. In Step 1607, the development progress selecting device 718 searches for a job of each user. This search is on the premise that a job given to a user or a user group using the user terminal 107, e.g. a simulation including a certain part and software is registered in the system by a manager of the user or the user group or the user himself. A widely or publicly known technology may be used for methods for inputting and storing this job.

Subsequently, in Step 1608, the development progress selecting device 718 searches the simulation configuration history database 721 of the dynamic computational resource distribution system 100 and the resource usage management database 711 and searches for a history of a simulation task configuration corresponding to the job searched for in Step 1607. If a search result is found, a dependency relationship of the information relating to this simulation is analyzed in next Step 1609.

The development progress selecting device 718 executes a search using the identification number of the user or the user group and the corresponding simulation as keywords in Step 1600. In the resource usage management database 711, the execution time of the simulation and the information on the software and the file used in the simulation are searched for. In the operation history database 708, history information of information files on the GUI operations, usage events of the functions of the software and times at which the events occurred are searched for.

Figure 21:
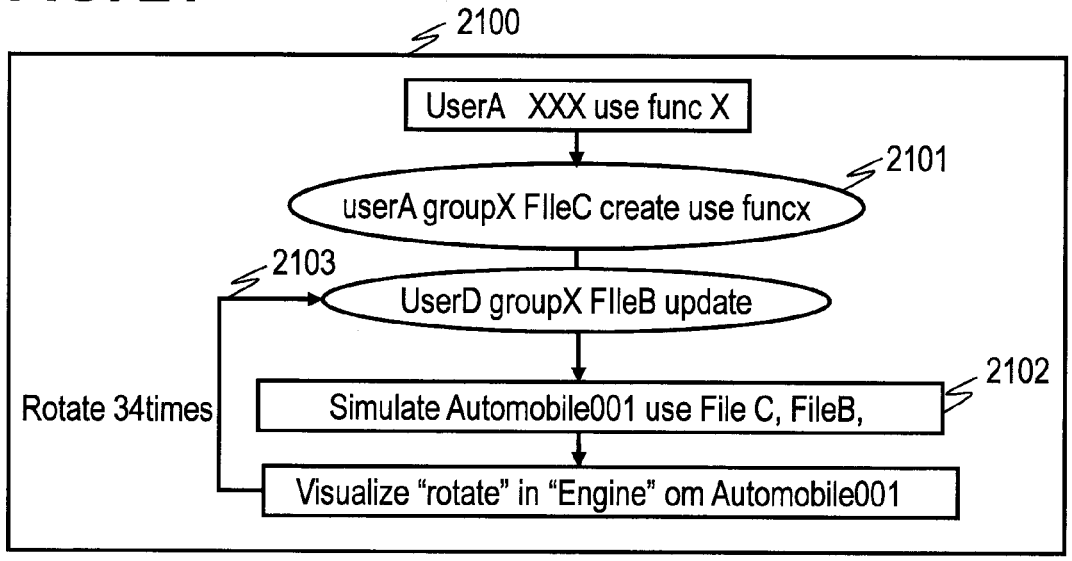
FIG. 21 is a diagram showing the first embodiment of the present invention and an example of an information flow graph of a graph structure that a task given from a user by analyzing a temporal sequence and the flow of operations is a base point, simulation trials and file changes are points and a dependency relationship of information is an edge.

In Step 1600, the development progress selecting device 718 tabulates search results and generates an information flow graph 2100 as shown in FIG. 21.

The information flow graph 2100 of FIG. 21 has a graph structure that a simulation task given to the user by analyzing a temporal sequence and the flow of operations is a base point, simulation trials and file changes are points and a dependency relationship of the information is an edge. If there is a Step in which the corresponding information is referred to at a later time for information or a file changed in a certain Step such as Steps 2101 and 2102 of FIG. 21, a dependency relationship is thought to exist between two Steps.

If a plurality of sequences having the same dependency relationship appear through time, the development progress selecting device 718 collectively visualizes these sequences having the dependency relationship as a loop 2103.

In Step 1602, the development progress selecting device 718 can select a list of files or software created or changed in the process of executing the simulation job given to the user by the information flow graph 2100 obtained in above Step 1600 and analyzing the development information. In Step 1603, the development progress selecting device 718 issues a development progress report including an selection result and records it in the development progress information database 720.

The development progress selecting device 718 also analyzes a loop structure of the information flow graph 2100. An example of an analysis of the loop structure is as below. If the simulation trial is continued without changing the simulation configuration or the parameters, a self-loop, i.e. a part where an edge extends from a certain point to itself is present in this simulation part in the information flow graph 2100. The loop structure is analyzed by selecting a layered structure of the loop, measuring work efficiency of a work flow and selecting an achievement degree of the job given to the user besides selecting such a self-loop.

Figure 22:
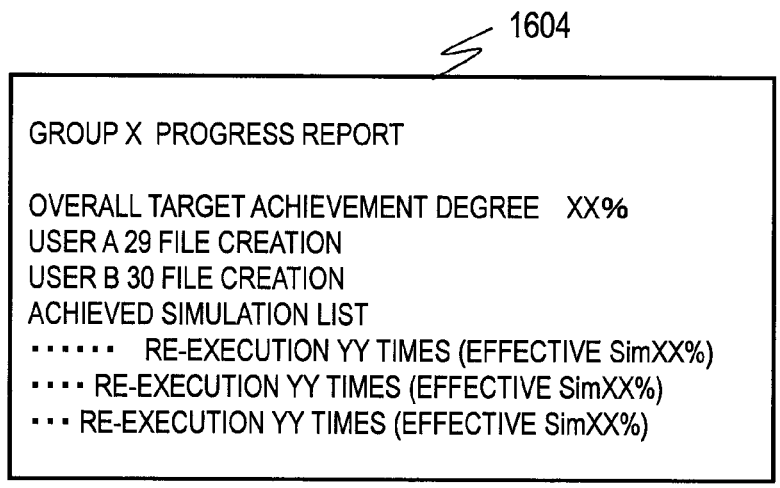
FIG. 22 is a diagram showing the first embodiment of the present invention and an example of a development progress report.

The development progress selecting device 718 creates a development progress report 1604 (illustrated in FIG. 22) including a progress rate of the simulation process selected in Step 1602, the information of the file created in executing the simulation, the number of executed simulations and effectiveness thereof and stores it in the development progress information database 720. The development progress report 1604 of FIG. 22 is absolutely an example of its configuration and a widely or publicly known technology may be used for a method for adding and expressing information other than those listed above.

Figure 16B:
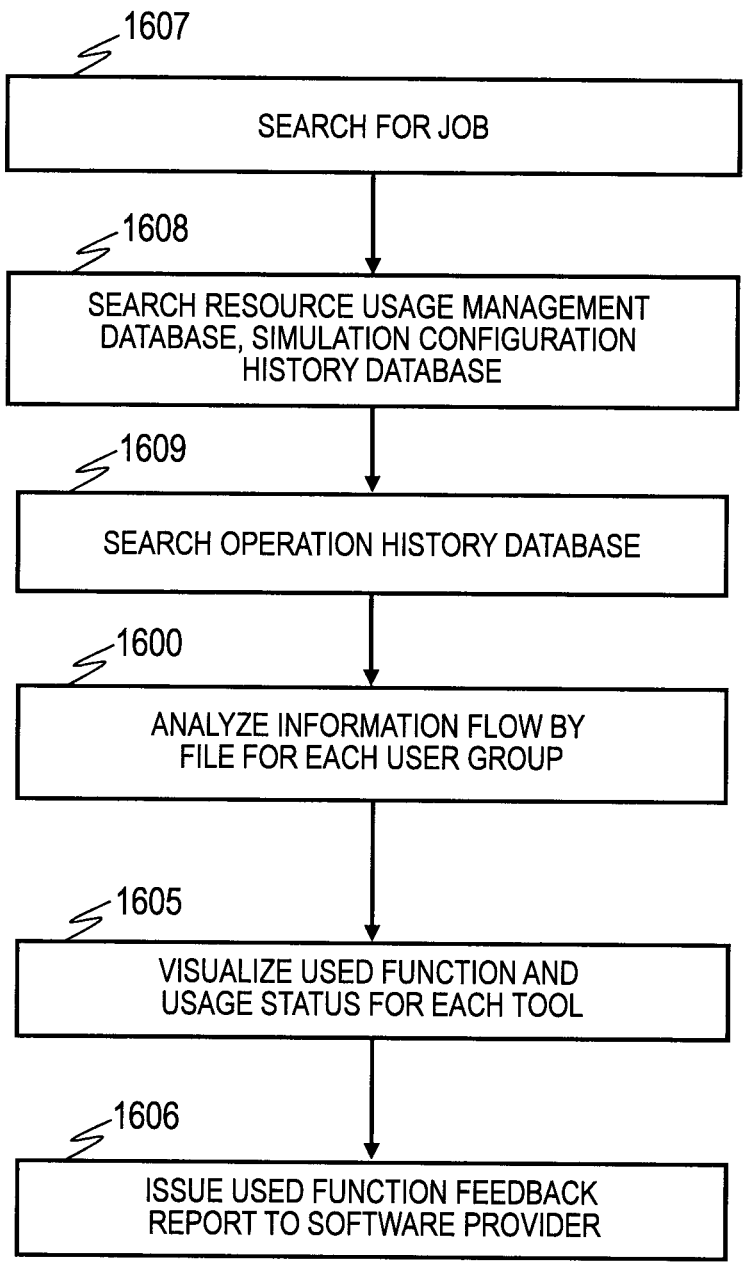
FIG. 16B is a flow chart showing the first embodiment of the present invention and an example of a process of analyzing a tool usage status.

Finally, selection of the software usage status by the behavior history of the user executed by the development progress selecting device 718 is described using FIG. 16B.

Since Steps 1607 to 1600 of FIG. 16B are the same as Steps 1607 to 1600 of the development progress status selection flow by the behavior history of the user shown in FIG. 16A, these Steps are not repetitively described. In Steps 1608, 1609 of FIG. 16B, searches in the resource usage management database 711 and the simulation configuration history database 721, and the information flow analysis and the generation of the information flow graph 2100 are common to the analysis of the development progress described with reference to FIG. 16A. However, a search is executed using the ID of the software installed into the present system as a keyword in the selection of the software usage status shown in FIG. 16B.

The development progress selecting device 718 obtains the functions of the software and a usage frequency distribution of the parameters from the event table 1810 of the operation history database 708. Further, the files used in association with the software or information on another software are collected based on the information flow graph 2100 used in the development progress status selection described above.

In Step 1605, the development progress selecting device 718 processes the collected information into a form that can be visualized as a tool usage status report 2500 as shown in FIG. 25. The tool usage status report 2500 is stored in the tool usage status database 719 and issued to the software provider (Step 1606).

The tool usage status report 2500 of FIG. 25 is absolutely an example of its configuration and a widely or publicly known technology may be used for a method for adding and expressing information other than those listed above.

As described above, in this embodiment, the dynamic computational resource distribution system calculates an arrangement relationship of simulators on the simulation computational resources so as to execute a simulation configuration optimally based on a coupling relationship of parts (mechanism to be developed, hardware, software) in a simulation task input from the user terminal, and constructs an actual simulation task. In this way, a simulation can be executed at a high speed.

Further, for each user of the embedded system development, a simulation or software usage history is selected and recorded with high accuracy, and a development process of each user is selected from the recorded information. In this way, the progress of each user can be easily managed.

Further, by unifying the work computational resources 722 and the simulation computational resources 101, initial investment for maintenance of a development environment and maintenance cost can be reduced. Furthermore, by unifying the work computational resources 722 and the simulation computational resources 101, design files (simulation models, parameters, etc.) can be shared and efficiency in embedded system development can be improved even in the case of simultaneous development at a plurality of sites. Particularly, since the simulators or the software are all managed on the unified computer system, embedded system developers need not purchase the software in advance or maintain the software by themselves.

Further, since the cooperation of a plurality of simulators and adjustment of simulator parameters are automated by reusing the past parameters and simulation configurations based on the information collected for each user, quick and accurate simulations can be easily executed even if developers (users) do not have detailed know-how. In this way, efficiency in embedded system development can be improved.

Further, since the developed software and simulation results using this software are safely transferred in the unified computer system, design files can be more easily shared and a risk of leaking information to outsiders can be suppressed.

Second Embodiment

Figure 29:
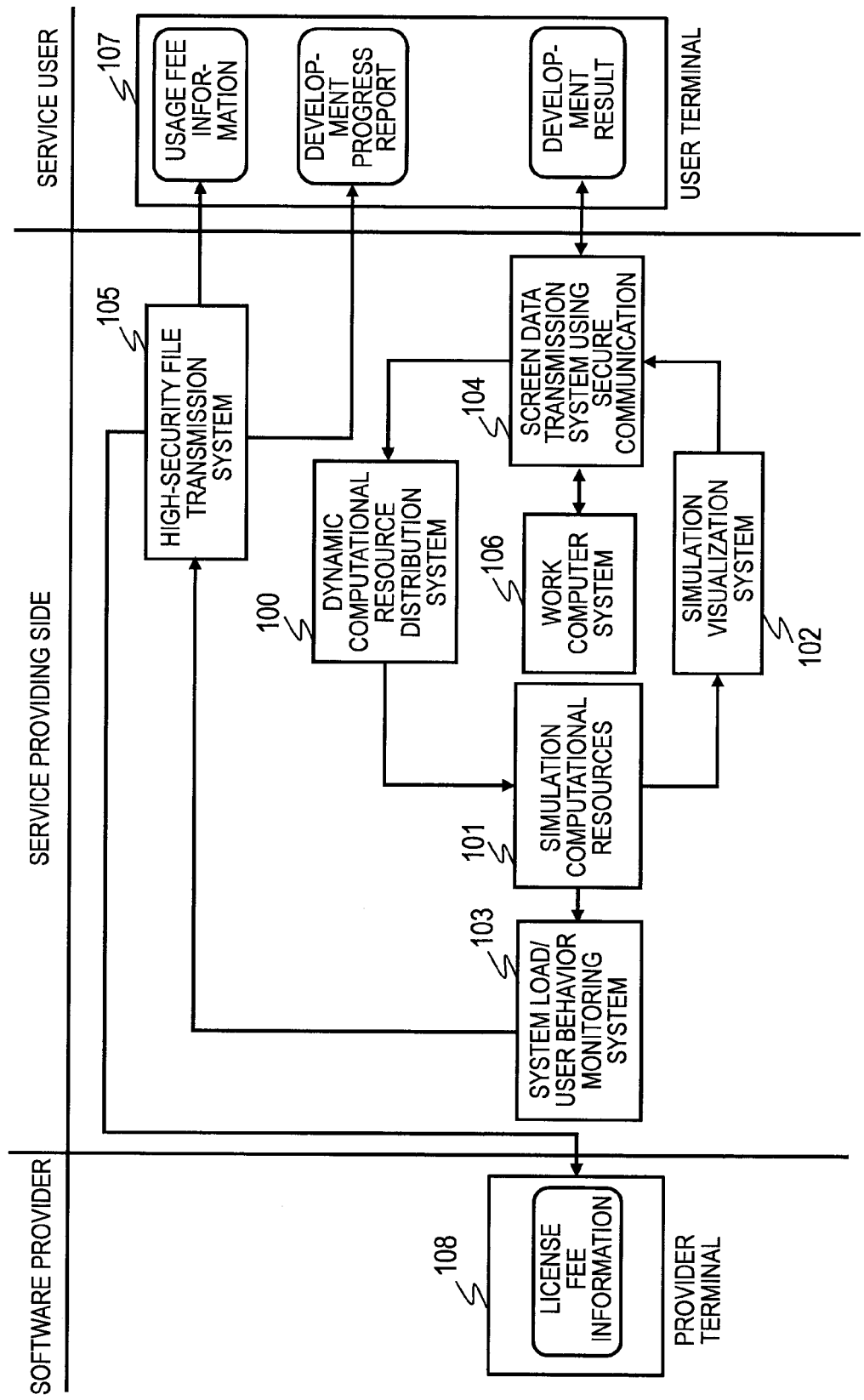
FIG. 29 is a block diagram showing a second embodiment of the present invention and functional elements of a computer system.

FIG. 29 is a block diagram schematically showing an example of a second embodiment of the present invention. The second embodiment includes a high-security file transmission system 105 in addition to the configuration of the first embodiment. A user terminal 107 or a provider terminal 108 can receive a system usage report, a license fee report, a development progress report and a software usage status report provided from a system load/user behavior monitoring system 103 via the high-security file transmission system 105.

This eliminates the need to directly connect the user terminal 107 and the provider terminal 108 to the system load/user behavior monitoring system 103 of the present system in obtaining and confirming the reports. This eliminates the need to connect the user terminal 107 and the like to a dynamic computational resource distribution system 100, a simulation computational resources 101, a simulation result visualization system 102 and the system load/user behavior monitoring system 103 other than during a development operation, wherefore security can be further improved.

Note that the function of the development progress selecting device 718 constituting the system load/user behavior monitoring system 103 of the first embodiment shown in FIG. 3 may be incorporated into the system usage fee generating device for calculating a system usage fee and a license usage fee incurred by using the present system.

The system usage fee generating device selects a development progress selecting the user's development process in the present system, calculates a system usage fee to be demanded and a license fee to be paid and creates a development progress report and a software usage status report of each user based on screen operation information and file operation information of each user and loads on the simulation computational resources in the present system.

Further, the work computer system 106 of the first embodiment shown in FIG. 3 functions as work computational resources arranged on the network and including a computer remotely operable from the user terminal 107. Further, the work computer system 106 functions as a user file storage arranged on the network, storing created design files from the user terminal 107 and including a storage which can be shared by other user terminal(s) 107.

Furthermore, the work computer system 106 functions as a work environment providing device as a device for providing the work computational resources and the user file storage in combination in response to a request from the user terminal 107. In this way, the work computer system 106 realizes design file creation in the user terminal 107 and sharing of design files by a plurality of user terminals 107.

Further, the simulation task input device 704 of the dynamic computational resource distribution system 100 of the first embodiment shown in FIG. 3 includes the tool palette from which simulation models usable from the user terminal 107 are selectable and the model construction display region on which simulation models can be arranged. The tool palette and the model construction display region are GUIs enabling the simulation task input device 704 to configure a simulation according to an input from the user terminal 107.

The tool palette provides a GUI in which one or more simulation models having specific detailed information deleted are arranged. On the model construction display region, simulation models selected from the tool palette are arranged according to an input from the user terminal 107, the arranged models are connected by lines, and information specific to the simulation models is displayed and set. According to a screen operation using the tool palette and the model construction display region, the simulation task input device 704 constructs a simulation configuration.

Although the devices in the dynamic computational resource distribution system 100, the simulation computational resources 101, the simulation result visualization system 102, the system load/user behavior monitoring system 103, the work computer system 106 and the screen data transmission system 104 using secure communication of the first embodiment shown in FIG. 3 are expressed as computers, software executed in the devices may be executed by one computer. In this case, the devices in the systems 101 to 104 may be, for example, termed as a user behavior statistics unit.

The software program operating in the present system can be stored in a computer-readable medium after or without being compressed. Any type of medium such as a semiconductor memory, a magnetic memory or an optical disk may be used.

Although the present invention has been described in detail with reference to the accompanying drawings, the present invention is not limited to such a specific configuration and includes various changes and equivalent configurations within the gist of accompanying claims.

INDUSTRIAL APPLICABILITY

As described above, the present invention can be applied to a computer system for designing by executing a simulation and a program of a development system.

What is claimed is:

1. A computer system with simulation computational resources including a plurality of computers with a processor and a memory and configured to execute a simulation, comprising:
a dynamic computational resource distribution unit which is connected to a terminal via a network, receives a request to create a simulation task from the terminal, creates a simulation configuration included in the simulation task based on the request from the terminal and issues a simulation included in the simulation configuration to the simulation computational resources;
a storage unit for storing the request to create the simulation task received from the terminal; and
a history monitoring unit for collecting an operation history for the simulation task received from the terminal and loads of the simulation computational resources required to execute the simulation task for each user of the terminal; wherein:
the simulation computational resources includes a plurality of different types of simulators in advance;
the dynamic computational resource distribution unit records elements of simulations executed by the simulation computational resources, applies recorded elements of past simulations to the received simulation task and allocates the simulation computational resources for executing simulations to which the elements are applied based on the loads of the simulation computational resources collected by the history monitoring unit;
the dynamic computational resource distribution system includes:
a simulation task input unit for creating the simulation configuration meeting the request to create the simulation task received from the terminal;
a simulation task creating unit for creating a collection of simulations to be allocated to the simulation computational resources from the created simulation configuration;
a tool/model database for recording simulation models used in the simulations to be allocated to the simulation computational resources;
a computational resource management database for managing a usage status of the simulation computational resources; and
a simulation configuration history database for recording the executed simulation configuration; and
the simulation task creating unit converts the simulation configuration created by the task input unit into a computational process executable in the simulation computational resources based on information of the simulation configuration history database, the tool/model database and the computational resource management database.

2. The computer system according to claim 1, wherein:
the simulation task input unit:
provides a tool palette storing simulation models selectable from the terminal in advance and a model construction display region, on which simulation models preset for the simulation task can be arranged, to the terminal, and
creates the simulation configuration according to an input on the model construction display region;
the tool palette is a GUI in which one or more simulation models having specific detailed information deleted are arranged; and
the model construction display region is a GUI in which simulation models selected from the tool palette are arranged, the arranged models are connected by lines and information specific to the simulation models are displayed and set.

3. The computer system according to claim 2, wherein the simulation task creating unit is connected to the tool/model database, the computational resource management database and the simulation configuration history database, receives the simulation configuration created by the simulation task input unit, allocates simulators as simulation tools required by the simulation configuration and the simulation computational resources and adjusts parameters of the simulators so that a coupling relationship of the simulation computational resources meets the request to create the simulation task received from the terminal based on a coupling relationship of the simulation models in the simulation configuration and information stored in the tool/model database.

4. The computer system according to claim 1, wherein:
the history monitoring unit includes a user behavior statistics unit; and
the user behavior statistics unit:
collects screen operation information and file operation information from the terminal as the request to create the simulation task the dynamic computational resource distribution unit receives from the terminal, and
generates software operation history information indicating behavior of a user using the terminal by relating an operation of specific software to specific screen operation information and specific file operation information.

5. The computer system according to claim 4, wherein:
the history monitoring unit selects a relationship between pieces of software operation history information based on a change to a file, a dependency relationship of reference and a temporal sequence included in the pieces of software operation history information output by the user behavior statistics unit.

6. The computer system according to claim 4, wherein:
the history monitoring unit includes an information flow analyzing unit for generating an information flow by analyzing the software operation history information generated by the user behavior statistics unit and a development progress selecting unit for selecting a development progress and a software usage status by analyzing a dependency relationship of information included in the screen operation information and the file operation information; and
the dynamic computational resource distribution unit:
estimates, based on information selected by the development progress selecting unit for an execution history of a simulation configuration recorded in the simulation configuration history database, a contribution of the simulation in a development progress,
estimates a load distribution of the simulation based on load information of the simulation computational resources, and
evaluates task creation accuracy of the simulation task creating unit for the simulation configuration based on the estimate of the contribution and the estimate of the distribution.

7. A non-transitory computer-readable medium comprising computer instructions executable by a processor to cause the processor to perform a method including:
a first step of receiving a request to create a simulation task from a terminal connected via a network, creating a simulation configuration included in the simulation task based on the request from the terminal and issuing a simulation included in the simulation configuration to a simulation computational resources including a plurality of different types of simulators in advance, a second step of storing the request to create the simulation task received from the terminal in a storage of the computer; and a third step of collecting an operation history for the simulation task received from the terminal and loads of the simulation computational resources required to execute the simulation task for each user of the terminal;

wherein, in the first step, elements of simulations executed by the simulation computational resources are recorded, recorded elements of past simulations are applied to the received simulation task and the simulation computational resources for executing simulations to which the elements are applied is allocated based on the collected loads of the simulation computational resources;

the first step includes:
- a simulation task input step of creating the simulation configuration meeting the request to create the simulation task received from the terminal;
- a simulation task creating step of creating a collection of simulations to be allocated to the simulation computational resources from the created simulation configuration;
- a step of recording simulation models used in the simulations to be allocated to the simulation computational resources in a tool/model database;
- a step of managing a usage status of the simulation computational resources in a computational resource management database; and
- a step of recording the executed simulation configuration in a simulation configuration history database; and in the simulation task creating step, the simulation configuration created in the simulation task input step is converted into a computational process executable in the simulation computational resources based on information of the simulation configuration history database, the tool/model database and the computational resource management database.

8. The non-transitory computer-readable medium according to claim 7, wherein:

the simulation task input step includes:
- a step of providing a tool palette storing simulation models selectable from the terminal in advance and a model construction display region, on which simulation models set for the simulation task in advance can be arranged, to the terminal; and
- a step of creating the simulation configuration according to an input on the model construction display region;

the tool palette is a GUI in which one or more simulation models having specific detailed information deleted are arranged; and the model construction display region is a GUI in which simulation models selected from the tool palette are arranged, the arranged models are connected by lines and information specific to the simulation models are displayed and set.

9. The non-transitory computer-readable medium according to claim 8, wherein, in the simulation task creating step, the created simulation configuration is received;

simulators as simulation tools required by the simulation configuration and the simulation computational resources are allocated by referring to the tool/model database, the computational resource management database and the simulation configuration history database; and parameters of the simulators are so adjusted that a coupling relationship of the simulation computational resources meets the request to create the simulation task received from the terminal based on a coupling relationship of the simulation models in the simulation configuration and information stored in the tool/model database.

10. The non-transitory computer-readable medium according to claim 7, wherein, in the third step, screen operation information and file operation information from the terminal are collected as the request to create the simulation task received from the terminal; and software operation history information indicating the behavior of a user using the terminal is generated by relating an operation of specific software to specific screen operation information and specific file operation information.

11. The non-transitory computer-readable medium according to claim 10, wherein, in the third step, a relationship between pieces of software operation history information is selected based on a change to a file, a dependency relationship of reference and a temporal sequence included in the software operation history information.

12. The non-transitory computer-readable medium according to claim 10, wherein:

in the third step, an information flow is generated by analyzing the software operation history information and a development progress and a software usage status are selected by analyzing a dependency relationship of information included in the screen operation information and the file operation information; and in the first step, a contribution of a simulation in a development progress is estimated based on information selected for an execution history of the simulation configuration recorded in the simulation configuration history database, a load distribution of the simulation is estimated based on load information of the simulation computational resources and task creation accuracy of the simulation task for the simulation configuration is evaluated based on the estimate of the contribution and the estimate of the distribution.

13. A method for allocating computational resources to be used in a simulation, comprising:

a first step of receiving a request to create a simulation task from a terminal connected via a network, creating a simulation configuration included in the simulation task based on the request from the terminal and issuing a simulation included in the simulation configuration to simulation computational resources including a plurality of different types of simulators in advance, a second step of storing the request to create the simulation task received from the terminal in a storage of a computer; and a third step of collecting an operation history for the simulation task received from the terminal and loads of the simulation computational resources required to execute the simulation task for each user of the terminal;

wherein, in the first step, elements of simulations executed by the simulation computational resources are recorded, recorded elements of past simulations are applied to the received simulation task and the simulation computational resources for executing simulations to which the elements are applied is allocated based on the collected loads of the simulation computational resources;

wherein the first step includes:

a simulation task input step of creating the simulation configuration meeting the request to create the simulation task received from the terminal;

a simulation task creating step of creating a collection of simulations to be allocated to the simulation computational resources from the created simulation configuration;

a step of recording simulation models used in the simulations to be allocated to the simulation computational resources in a tool/model database;

a step of managing a usage status of the simulation computational resources in a computational resource management database; and a step of recording the executed simulation configuration in a simulation configuration history database; and in the simulation task creating step, the simulation configuration created in the simulation task input step is converted into a computational process executable in the simulation computational resources based on information of the simulation configuration history database, the tool/model database and the computational resource management database.

* * * * *